(12) United States Patent
Rivieres et al.

(10) Patent No.: US 10,829,581 B2
(45) Date of Patent: Nov. 10, 2020

(54) CURABLE RESIN AS A SUBSTITUTE FOR PHENOLIC RESINS AND THE APPLICATIONS THEREOF

(71) Applicants: ArianeGroup SAS, Paris (FR);
Universite de Reims Champagne-Ardenne, Reims (FR);
Centre National de la Recherche Scientifique, Paris (FR)

(72) Inventors: Bastien Rivieres, Le Segur (FR);
Brigitte Defoort, Saint Medard en Jalles (FR); Cécile Lesamber, Bordeaux (FR); Xavier Coqueret, Reims (FR)

(73) Assignees: ARIANEGROUP SAS, Paris (FR);
UNIVERSITE DE REIMS CHAMPAGNE-ARDENNE, Reims (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 16/073,719

(22) PCT Filed: Jan. 26, 2017

(86) PCT No.: PCT/EP2017/051619
§ 371 (c)(1),
(2) Date: Jul. 27, 2018

(87) PCT Pub. No.: WO2017/129661
PCT Pub. Date: Aug. 3, 2017

(65) Prior Publication Data
US 2019/0040178 A1    Feb. 7, 2019

(30) Foreign Application Priority Data
Jan. 29, 2016  (FR) ..................................... 16 50755

(51) Int. Cl.
| | | |
|---|---|---|
| C08G 8/30 | (2006.01) | |
| B64G 1/58 | (2006.01) | |
| C08G 8/36 | (2006.01) | |
| C08L 61/14 | (2006.01) | |
| C08G 8/28 | (2006.01) | |

(52) U.S. Cl.
CPC .............. C08G 8/30 (2013.01); B64G 1/58 (2013.01); C08G 8/28 (2013.01); C08G 8/36 (2013.01); C08L 61/14 (2013.01); *C08L 2203/00* (2013.01)

(58) Field of Classification Search
CPC . C08G 8/30; C08G 8/36; C08G 75/04; C08G 18/28; C08L 81/02; C08L 81/04;
(Continued)

(56) References Cited

U.S. PATENT DOCUMENTS

2012/0286435 A1* 11/2012 Bojkova .......... B29D 11/00009
264/1.1

FOREIGN PATENT DOCUMENTS

| WO | WO-01/71020 A2 | 9/2001 |
| WO | WO-2006/044290 A2 | 4/2006 |
| WO | WO-2011/131691 A1 | 10/2011 |

OTHER PUBLICATIONS

Dirlikov, High performance Polymers, vol. 2, No. 1, 1990, 67-77.*
(Continued)

*Primary Examiner* — Shane Fang
(74) *Attorney, Agent, or Firm* — Alston & Bird LLP

(57) ABSTRACT

The invention relates to a curable resin that represents an excellent substitute for phenolic resins and is therefore able to replace phenolic resins in all applications in which they are used. Said resin is characterised in that it comprises: (1) at least one prepolymer resulting from the prepolymerisation of a compound A comprising at least one aromatic or heteroaromatic ring, a first group —O—CH2-C≡CH and at least one second group selected from the groups
(Continued)

—O—CH2-C≡CH2 and —CH2-CH=CH2, said groups being carried by the at least one aromatic or heteroaromatic ring; and (2) a compound B comprising at least two thiol groups (—SH). The invention also relates to a material obtained by curing said curable resin, and in particular to an ablative composite material. The invention further relates to a material obtained by curing said curable resin.

21 Claims, 8 Drawing Sheets

(58) Field of Classification Search
CPC .. C08L 2201/10; C08L 2201/05; C08L 61/14; C08L 2203/00; C08K 3/22; G02B 1/041; B64G 1/58
See application file for complete search history.

(56) References Cited

OTHER PUBLICATIONS

Blackwell, H.E., et al., "New Approaches to Olefin Cross-Metathesis," J. Am. Chem. Soc., 122: 58-71 (2000).
Cervera-Procas, R., et al., "A Polymer Network Prepared by the Thiol-yne Photocrosslinking of a Liquid Crystalline Dendrimer," Macromolecular Rapid Communications, 34: 498-503 (2013).
Chatani, S., et al., "Facile and Efficient Synthesis of Dendrimers and One-Pot Preparation of Dendritic—Linear Polymer Conjugates via a Single Chemistry: Utilization of Kinetically Selective Thiol—Michael Addition Reactions," Macromolecules, 47: 4894-4900 (2014).
Joshi, M.C., et al., "Syntheses and antibacterial activity of phedioxy substituted cyclic enediynes," Bioorganic & Medicinal Chemistry Letters, 17: 3226-3230 (2007).

* cited by examiner

CURABLE RESIN AS A SUBSTITUTE FOR PHENOLIC RESINS AND THE APPLICATIONS THEREOF

CROSS-REFERENCE TO RELATED APPLICATIONS(S)

This application is a U.S. National Stage entry of International Application No. PCT/EP2017/051619 filed Jan. 26, 2017, which claims the benefit of French Patent Application No. 1650755, filed Jan. 29, 2016, each of which is herein incorporated by reference in its entirety for all purposes.

TECHNICAL FIELD

The invention relates to the field of curable resins and materials obtained from these resins.

More specifically, it relates to a curable resin which is an excellent substitute for phenolic resins and is therefore capable of replacing phenolic resins in all applications in which they are used and, in particular, but not only, in the manufacture of composite materials called "ablative" such as those used in the constitution of:
  thermal shields that protect vehicles sent into space (shuttles, artificial satellites, rockets, probes, etc.) from the kinetic heating they undergo when they enter the atmosphere of a planet of the solar system (Earth, Mars, Venus, Jupiter, etc.) or a satellite of a planet (moon for example); or
  nozzle walls of propulsion engines, for example, for space launchers.

The invention also relates to a material which is obtained by curing this curable resin and, in particular, to an ablative composite material.

The invention further relates to the use of the curable resin for the manufacture of an ablative composite material and, more specifically, to the use of an ablative thermal protection composite material, in particular for the aerospace industry.

STATE OF THE ART

An ablative material is defined as a material that is capable of being ablated, i.e. to undergo a loss of substance by chemical decomposition, change of state, or mechanical erosion under the effect of a material flow or radiation (Official Journal of the French Republic of 22 Sep. 2000).

Typically, in the case of an ablative material of the type mentioned above, the outer layer of the ablative material which is in direct contact with the environment, for example the atmosphere during a re-entry phase into the atmosphere, undergoes a chemical transformation under the effect of the heat as well as a recession which is linked to this transformation but also to other phenomena such as mechanical or aerodynamic shearing.

This outer layer radiates outwards and its chemical conversion consumes energy, wherein the two effects contribute to a lower transmission of heat to the inner layers of the material and, therefore, to thermal insulation of the underlying structure.

A good ablative material must be such that:
  its chemical transformation under the effect of heat is (very) endothermic;
  its thermal conductivity is low, in steady state and/or transient state (diffusivity in this case); and
  its chemical transformation is not accompanied by a too fast recession.

This last point is met when the chemical transformation of the ablative material is accompanied by the formation of a "crust" which, on the one hand, limits or even eliminates the recession of purely chemical origin and, on the other hand, is able to withstand mechanical recession-related shearing.

For atmospheric re-entry or propulsion applications, the expected "crusts" are based on carbon or silica, and come from the pyrolysis of polymers, organic or silicone, respectively.

It is considered that the organic polymers best suited to the manufacture of ablative materials must be capable of giving a large amount of carbon, which is expressed by the fact that their "coke rate" must be high. This coke rate is defined as the mass of the residue which is obtained when a sample of an organic polymer is decomposed by pyrolysis, at a temperature greater than or equal to 900° C. and under a neutral gas (nitrogen or argon), compared to the initial mass of this sample. The coke rate is greater than 50% and may even exceed 60% for the best organic polymers with ablative potential.

This is the case of the coke rate of certain phenolic resins, which are, to date, the curable resins most frequently used for the manufacture of ablative materials. The high coke rate of these resins is also used for the development of certain radiative thermal protective composite materials, namely ceramic matrix composites.

Phenolic resins are obtained by polycondensation of monomers from petrochemicals: phenol and formaldehyde, which is why they are also known as phenol-formaldehyde resins or formophenolic resins.

The widespread use of phenolic resins in the plastics industry is explained by their thermal resistance (they only start to decompose at around 300° C.), their electrical resistance, fire resistance, and the low smoke emission generated when exposed to flames. As early as 1908, phenolic resins were associated with various reinforcing materials to make parts for electronics. In aeronautics, they may act as binders in composite materials reinforced with fiberglass or aramid for interior design parts (aircraft floors for example), radomes and canopies. Large volumes of phenolic resins are, moreover, used as varnish or for the manufacture of wood panels (agglomerates, plywood, oriented chipboard, etc.).

However, it turns out that phenol is toxic and highly corrosive to unprotected living tissue, while formaldehyde is known to be carcinogenic (it is believed to cause nasopharyngeal cancers), while the vapors it emits are extremely irritating to the eyes and the respiratory tract of patients. These two compounds are therefore under the supervision of Regulation (EC) No 1907/2006 of the European Parliament and the Council called "REACh", whose main objective is to better protect human health and the environment against the risks that the chemicals may present, and thus the materials obtained from phenol and formaldehyde are threatened with obsolescence.

Given the place currently occupied by phenolic resins in the plastics industry and the disadvantages that their precursors exhibit in terms of toxicity, it is desirable to have new curable resins which, while offering similar properties to those of phenolic resins, may be obtained from non-toxic precursors or, at least, precursors that are less toxic than phenol and formaldehyde.

It turns out, moreover, that the polycondensation of phenol and formaldehyde is never complete, hence the presence of volatile compounds and water molecules which are very difficult to eliminate if a well-defined thermal cycle is not followed during this polycondensation, and which may lead to porous materials in their native state as well as degassing during the life of materials made from phenolic resins. This degassing may have very harmful consequences in certain applications such as, for example, aerospace applications.

The inventors have therefore set themselves the general objective of developing curable resins suitable for replacing phenolic resins in all their applications and, in particular, in their use as ablative materials, the preparation of which is free from the disadvantages presented by that of phenolic resins, both in terms of the toxicity of the precursors used and in terms of porosity and degassing of the materials obtained from these resins.

In this context, they have more specifically set a goal that these resins:

(1) have properties close to those of a commercial phenolic resin commonly used in the aerospace industry for the elaboration of ablative composite materials, Ablaphene RA 101, namely: a coke rate greater than 50%, a temperature glass transition temperature greater than 250° C. (ideally as high as possible) and a sufficiently low viscosity at temperatures below 80° C. (typically less than 2 Pa.s) to allow their use in methods for impregnating reinforcing fibers without having to use an organic solvent; and (2) may be obtained from precursors which, besides not being toxic, or only very slightly toxic, are derived from biomass so as to overcome the volatility of fossil raw material prices, anticipate their depletion, reduce the release of greenhouse gases of fossil origin, preserve the environment, and give resins and materials obtained from it a renewable character.

DESCRIPTION OF THE INVENTION

These and other objects are achieved by the invention which proposes firstly a curable resin, which is characterized in that it comprises:

(1) at least one prepolymer resulting from the prepolymerization of a compound A comprising one or more aromatic or heteroaromatic cycles, a first group —O—CH$_2$—C≡CH and at least one second group selected from the groups —O—CH$_2$—C≡CH and —CH$_2$—CH=CH$_2$, wherein these groups are borne by the aromatic cycle or heteroaromatic cycle(s); and (2) a compound B comprising at least two thiol groups (—SH).

In what precedes and what follows, the term "prepolymer" is understood to have its usual meaning, namely that it designates an oligomer or a polymer having at least two reactive groups which allow it to participate in a subsequent polymerization, whether under the effect of heat, light (visible, ultraviolet or infrared light), ionizing radiation (electron beam, β or γ radiation, X-rays, etc.) or any other means.

In the context of the invention, the reactive groups of the prepolymer are represented by the free —O—CH$_2$—C≡CH and/or —CH$_2$—CH=CH$_2$ groups that comprise this prepolymer, i.e. among those —O—CH$_2$—C≡CH and/or —CH$_2$—CH=CH$_2$ groups of the molecules of compound A which did not participate in the polymerization of this compound.

In what precedes and what follows, the term "aromatic cycle" is also understood to have its usual meaning, namely that it designates a unicycle or a polycycle which satisfies the rule of Hückel and which therefore has a number of delocalised electrons π equal to 4n+2, while the term "heteroaromatic cycle" means an aromatic cycle as just defined, but whose at least one carbon atom is replaced by a nitrogen, oxygen or sulfur atom.

Thus, the aromatic cycle(s) may, in particular, be benzene or naphthalenic cycles, while the heteroaromatic cycle(s) may be furanic, pyrrolic, thiophenic, pyridinic, quinolinic, isoquinolinic, pyrazinic, pyrimidinic cycles, and the like.

According to the invention, compound A is the product of a propargylation of a compound A' which comprises one or more aromatic or heteroaromatic cycles, a first hydroxyl (—OH) or carboxyl (—COOH) group and at least one second group selected from hydroxyl, carboxyl and —CH$_2$—CH=CH$_2$ groups, wherein these groups are borne by the aromatic or heteroaromatic cycles.

This propargylation, which consists in substituting the hydrogen atom of the hydroxyl and/or carboxyl group(s) that comprises the compound A' by a —CH$_2$—C≡CH group may, in particular, be carried out as described by M. C. Joshi et al. in *Bioorg. Med. Chem. Lett.* 2007, 17 (11), 3226-3230 (reference [1]), i.e. by reacting compound A' with a propargyl halide, typically propargyl bromide, in a strongly basic medium such as a medium comprising potassium carbonate in N,N-dimethylformamide, sodium hydride in tetrahydrofuran, or an aqueous solution of sodium hydroxide.

Typically, the compound A' and therefore the compound A derived therefrom are such that:

either they comprise only one aromatic or heteroaromatic cycle, in which case the two groups which the compounds A' and A must at least comprise are borne by the same aromatic heteroaromatic cycle;

or they comprise two or more aromatic or heteroaromatic cycles, in which case the two groups which the compounds A' and A must at least bear may be borne by the same aromatic or heteroaromatic cycle or by two different aromatic or heteroaromatic cycles.

In what precedes and what follows, it is considered that a group is borne by an aromatic or heteroaromatic cycle when this group is attached to an atom of this cycle, whether directly, i.e. by a covalent bond, or indirectly, i.e. by means of an acyclic spacer group such as, for example, a divalent saturated or unsaturated $C_1$ to $C_4$ hydrocarbon group.

However, in the context of the invention, it is preferred that the groups carried by the aromatic or heteroaromatic cycle(s) should be attached to an atom of this or these cycle(s) by a covalent bond or by a divalent methylene group (—CH2-).

On the other hand, when the compound A' and therefore the compound A derived therefrom, comprise two or more aromatic cycles, then it is preferred that these cycles are connected to each other either directly, i.e. a covalent bond, or by a divalent acyclic group comprising not more than 4 carbon atoms.

Thus, the compound A' may, in particular, be chosen from:

allylated monophenols, i.e. compounds which comprise a phenolic group and a —CH$_2$—CH=CH$_2$ group such as, for example, 2-allylphenol, chavicol (or 4-allylphenol), eugenol (or 2-methoxy-4-(2-propenyl)phenol), 4-allyl-2,6-dimethylphenol, etc;

polyphenols, i.e. compounds which comprise at least two phenolic groups, for example resorcinol (or 1,3-benzenediol) and its two isomers: hydroquinone (or benzene-1,4-diol) and pyrocathecol (or benzene-1,2-diol), phloroglucinol (or benzene-1,3,5-triol) and its two isomers: pyrogallol (or benzene-1,2,3-triol) and hydroxyquinol (or benzene-1,2,4-triol), resveratrol (or 5-[2-(4-hydroxyphenyl)ethenyl]-1,3-benzenediol), dimers of allylated monophenols such as eugenol dimers (2-methoxy-4-(2-propenyl)-phenol), etc;

phenolic acids, also called acids phenol, which comprise at least one phenolic group and at least one carboxylic acid group such as, for example, parahydroxybenzoic acid (or 4-hydroxybenzoic acid), gallic acid (or 4,5-trihydroxybenzoic acid) and its five isomers including phloroglucinic acid (or 2,4,6-trihydroxybenzoic acid) and pyrogalolcarboxylic acid (or 2,3,4-trihydroxybenzoic acid), vanillic acid (or 4-hydroxy-3-methoxybenzoic acid), salicylic acid (or 2-hydroxybenzoic acid) and its two isomers: 3-hydroxybenzoic acid and 4-hydroxybenzoic acid, protocatechic acid (or 3,4 dihydroxy-benzoic acid) and its five isomers including gentisic acid (or 2,5-dihydroxybenzoic acid) and α-, β- and γ-resorcylic acids, etc; and polycarboxylic acids with one or more aromatic or heteroaromatic cycles, for example phthalic acid (or benzene-1,2-dicarboxylic acid), isophthalic acid (or benzene-1,3-dicarboxylic acid), terephthalic acid (or benzene-1,4-dicarboxylic acid), trimilletic acid (or 1,2,3-benzene tricarboxylic acid), trimesic acid (or 1,3,5-benzene tricarboxylic acid), 2,6-naphthalenedicarboxylic acid, 1,5-naphthalenedicarboxylic acid, 4,4'-carbonyl-diphthalic acid, dehydromucic acid (or 2,5-furandicarboxylic acid), etc.

According to the invention, the compound A' may be derived from the petrochemical as well as from the biomass, either directly, i.e. that it is itself extracted from the biomass or produced by the biomass (production by a bacterial or fungal culture, for example), or indirectly, i.e. by transformation of a precursor which itself is extracted from biomass or produced by the biomass.

However, in the context of the invention, it is preferred that the compound A and therefore the compound A' from which it is obtained are derived from the biomass.

In this respect, it is noted that the biomass is represented by any organic matter of plant origin (including algae), animal, bacterial or fungal.

This is the reason why it is preferred to choose the compound A' from those of the aforementioned compounds which may be obtained from the biomass, i.e. the chavicol, eugenol, resorcinol, hydroquinone, pyrocathecol, phloroglucinol, pyrogallol, hydroxyquinol, resveratrol, dimers of allylated monophenols, parahydroxybenzoic acid, gallic acid and its five isomers, vanillic acid, salicylic acid, acid 3-hydroxybenzoic acid, 4-hydroxybenzoic acid, proto-catechic acid and its five isomers, and even more, among:

eugenol, which may, in particular, be obtained by extraction of essential oils of clove;

phloroglucinol which may, in particular, be obtained by bioconversion of glucose, xylose or arabinose as described in PCT International Application WO 2006/044290 (reference [2]);

resorcinol, which may, in particular, be obtained by hydrogenation of phloroglucinol as also described in reference [2];

gallic acid, which may, in particular, be obtained by hydrolysis of gallic tannins present in many plants or by glucose bioconversion as described in PCT International Application WO 01/071020 (reference [3]);

pyrogallol which may, in particular, be obtained by decarboxylation of gallic acid, for example by heat or biocatalysis, as also described in reference [3] mentioned above; and the eugenol dimers, such as the dimer of formula (I) below:

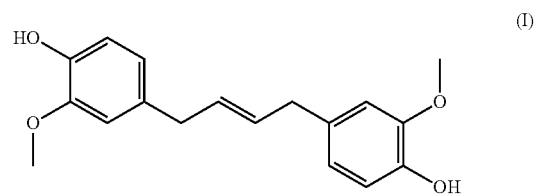 [SMILES: COc1cc(C/C=C/Cc2ccc(O)c(OC)c2)ccc1O]

which may be obtained from eugenol by a metathesis reaction of the type described by H. E. Blackwell et al. in *J. Am. Chem. Soc.* 2000, 122, 58-71 (reference [4]).

The prepolymerization of the compound A may be carried out thermally, for example by subjecting this compound to a series of steps of 2 hours each at 180° C. (with a return to ambient temperature between each step), under an inert atmosphere (nitrogen or argon), in order to obtain a B-stage substance comprising a mixture of prepolymers and residual monomers. The prepolymerization may be stopped at the moment when the heat generated during the polymerization of the material in B-stage is lower than the heat generated during the polymerization of the monomer alone, which may easily be determined by differential scanning calorimetry analysis (or DSC). Typically, the number of steps is between 10 and 15.

According to the invention, the compound B, whose role is to allow control of the polymerization/crosslinking profile of the prepolymer(s) during the curing of the resin (in particular with a reduction of the energy released during this curing), as demonstrated in the examples which follow, may be any thiolated compound provided that it comprises at least two thiol functions.

Thus, the compound B may also be derived from petrochemicals such as ethane-1,2-thiol, 1,3-propanedithiol, 1,4-butanedithiol, 1,5-pentanedithiol, 1,2-ethanediyl bis(3-sulfanylpropanoate), trimethylolpropane tris(3-mercaptopropionate), pentaerythritol tetrakis(3-mercaptopropionate) or dipentaerythritol hexa(3-mercaptopropionate), as derived from the biomass.

However, here again, it is preferred that the compound B is obtained from the biomass.

This is the reason why the compound B is preferably the product of a thiolation of a compound B' (i.e. of a grafting of at least two thiol functions on this compound B, which is itself derived from biomass and which comprises two or more groups selected from hydroxyl and carboxyl groups.

Thus, the compound B' is preferably, chosen from:

the same polyphenols and phenolic acids derived from the biomass as those mentioned above for the compound A', namely resorcinol, hydroquinone, pyrocathecol, phloroglucinol, pyrogallol, hydroxyquinol, resveratrol, dimers of allylated monophenols, parahydroxybenzoic acid, gallic acid and its five isomers, vanillic acid, salicylic acid, 3-hydroxybenzoic acid, 4-hydroxybenzoic acid, protocatechic acid and its five isomers, and polyphenol macromolecules derived from the biomass, for example lignins and tannins.

In the context of the invention, the term "lignin" covers any lignin derived from the biomass, whatever the way by which it was extracted from this biomass, as well as any macromolecular extract obtained by fractionation of a lignin.

Better still, the compound B' is chosen from phloroglucinol, resorcinol, gallic acid, pyrogallol, lignins and the eugenol dimer of formula (I) above.

The thiolation of compound B' may, in particular, consist in replacing the hydrogen atom of each hydroxyl or carboxyl group borne by the compound B' by a —(CH$_2$)$_3$SH group, in which case it may be implemented according to a protocol similar to that described by S. Chatani et al. in *Macromol.* 2014, 47 (15), 4894-4900 (reference [5]), i.e. by subjecting the compound B' to an allylation reaction with an allyl halide, typically allyl bromide, in a strongly basic medium, and then subjecting the compound B' thus allylated to a radical addition reaction with thioacetic acid in the presence of a free radical-producing agent such as azobisisobutyronitrile (or AIBN), and then subjecting the resulting product to a reaction allowing converting the thioester groups that it carries into thiol groups.

According to a particularly preferred arrangement of the invention, the compounds A and B are both derived from the biomass, in which case the resin may be described as a totally biosourced resin.

This biosourced resin may, for example, comprise:
- at least one prepolymer of propargylated resorcinol, propargylated gallic acid or of a propargylated eugenol dimer; and
- a thiolated resorcinol, a thiolated gallic acid, a thiolated lignin or a thiolated eugenol dimer.

In this resin, the respective proportions of the prepolymer(s) and of the compound B may vary over a wide range depending on the intended application of the resin and, therefore, on the properties that it is desired to confer on it, but also on the properties that are to be conferred on the materials which will be manufactured therefrom.

Thus, for example, when the resin is intended for the manufacture of a thermal protective ablative composite material and when a coke rate greater than 50% is desired, then this resin typically comprises from 80 to 95 parts by mass of prepolymer(s) for 5 to 20 parts by mass of compound B.

According to the invention, the resin may furthermore comprise a compound C which is the product of a propargylation of a polyphenol macromolecule derived from the biomass, for example a lignin or a tannin, in which case the resin may, for example, comprise:
- at least one one prepolymer of propargylated resorcinol, propargylated gallic acid or of a propargylated eugenol dimer;
- a thiolated resorcinol, a thiolated gallic acid, a thiolated lignin or a thiolated eugenol dimer; and
- a propargylated lignin.

Here again, the respective proportions of the prepolymer(s), the compound B and the compound C may vary over a wide range depending on the intended application of the resin. However, when this resin is intended for the manufacture of an thermal protective ablative composite material and when a coke rate greater than 50% is desired, then it typically comprises from 30 to 94 parts by mass of prepolymer(s), from 5 to 20 parts by mass of compound B, and from 1 to 50 parts by mass of compound C, the proportion of compound C being, more preferably, from 1 to 30 parts by mass when this compound is a lignin.

The resin may also comprise one or more adjuvants which, again, are chosen according to the intended application of this resin as well as its mode of implementation and, in particular, the manner in which its curing is desired to be achieved.

Thus, for example, this or these adjuvants may be chosen from latent initiators for polymerization/crosslinking when the curing of the resin is intended to be achieved thermally or partially by photochemical means, polymerization/crosslinking accelerators, polymerization/crosslinking inhibitors, antioxidants, flexibilizers, plasticizers, anti-UV agents, flame retardants, compatibilizers, anti-shrink agents and fillers, all of these adjuvants, and the conditions under which they may be used, being well known to those skilled in the art. On this point, the reader may refer to reference books such as the "TECHNIQUES DE l'INGÉNIEUR", volume "Plastics and Composites".

According to the invention, the curing of the resin may be carried out by any means capable of inducing the polymerization/crosslinking of the prepolymer(s) and, in particular, by the application of a heat treatment, a light treatment (visible light, UV or IR) or an ionizing radiation (electron beam, β or γ radiation, X-rays, etc.).

Although the resin according to the invention has a composition very different from that of the phenolic resins and may be, if desired, completely biosourced, it has been found to have properties similar to those of phenolic resins in terms of coke rate, glass transition temperature and viscosity and, in particular, to those of the phenolic resin Ablaphene RA 101 which is commonly used in aerospace for the preparation of ablative composite materials.

The resin according to the invention is therefore likely to be used in all applications of the phenolic resins and, more specifically, in the manufacture of ablative composite materials.

In addition, the invention also relates to a material which is characterized in that it is obtained by curing a curable resin as defined above, wherein this curing is optionally followed by a heat treatment to further improve the thermomechanical stability of this material.

According to the invention, this material is preferably a material forming the matrix of a composite material of the type comprising a matrix in which there is a reinforcement.

The reinforcement present in the composite material may be of different types.

Thus, it may, in particular, be a reinforcement consisting of fibers such as glass fibers, quartz fibers, carbon fibers, graphite fibers, silica fibers, metal fibers such as steel or aluminum fibers, boron fibers, ceramic fibers such as silicon carbide or boron carbide fibers, synthetic organic fibers such as aramid fibers, polyethylene fibers, polyester fibers or poly(p-phenylene benzobisoxazole) fibers, better known by the acronym PBO, natural organic fibers such as hemp fibers, flax fibers or silk fibers, or mixtures of such fibers, in which case this reinforcement, depending on the nature of the constituent fibers, may be in the form of chopped yarns, crushed fibers, continuous filament mats, chopped filament mats, rovings, fabrics, knits, felts, etc., or in the form of complexes made by association of different types of planar materials.

It may also be a reinforcement consisting of particles such as cork particles or refractory fillers of the tungsten type, magnesium oxide, calcium oxide, alumina, silica, zirconium dioxide, titanium dioxide, beryllium oxide, etc.

Moreover, the manufacture of the composite material may be carried out by any of the techniques known to those skilled in the art of composite materials such as, for example, by impregnation, by simultaneous injection molding, by autoclaved lay-up molding, by vacuum molding, by Resin Transfer Molding (RTM), by low pressure wet process molding, by BMC (Bulk Molding Compound), by compression molding of pre-impregnated mats (or SMCs for Sheet Molding Compound), by filament winding, by centrifugation or by pultrusion, impregnation being preferred when the reinforcement consists of fibers.

Preferably, the composite material is an ablative composite material and, more specifically, an ablative composite material for thermal protection, especially for aerospace.

Another object of the invention is the use of a curable resin as defined above for the manufacture of an ablative composite material and, more specifically, of an ablative material for thermal protection, in particular for aerospace purposes.

Other features and advantages of the invention will become apparent upon reading the additional description which follows, which relates to examples of preparation of resins according to the invention and of their characteristics and which is given with reference to the appended figures.

Of course, this additional description is given only as an illustration of the subject of the invention and does not constitute a limitation of this object.

DETAILED DESCRIPTION OF PARTICULAR EMBODIMENTS OF THE INVENTION

EXAMPLE 1

Figure 15:
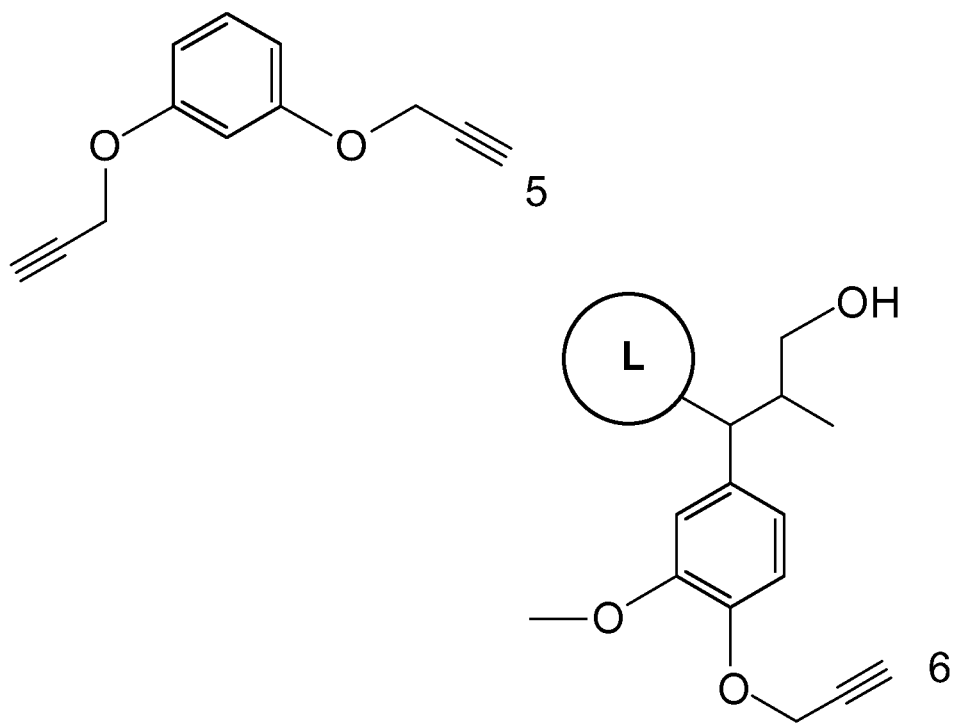
FIG. 15 illustrates the chemical structures of the propargylated resorcinol, denoted 5, of a phenylpropanoid unit, denoted 6, of a propargylated lignin (the rest of the propargylated lignin being symbolized by the letter L inscribed in a circle), of a propargylated eugenol dimer, denoted 7, and of propargylated gallic acid, denoted 8.
Figure 15:
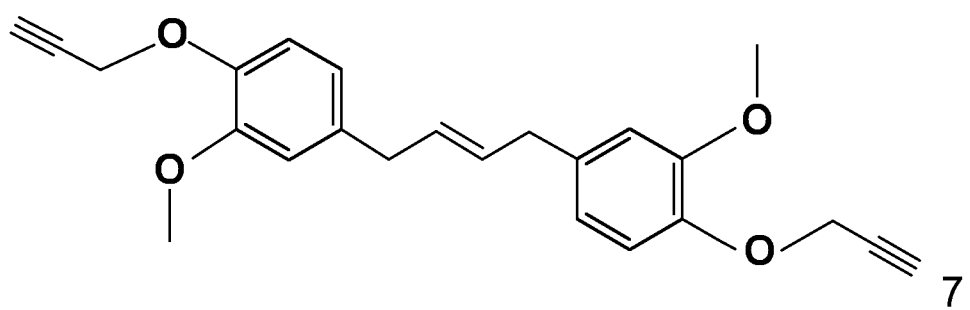
Figure 15:
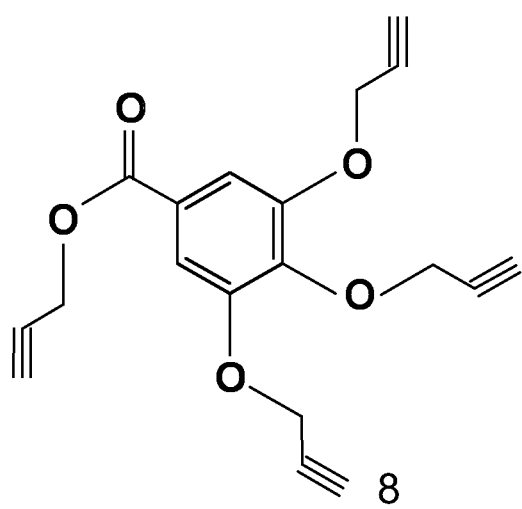

Preparation and Characteristics of a First Type of Curable Resins According to the Invention The present example relates to a first type of resins according to the invention which comprise:
  a mixture of prepolymers obtained by prepolymerization of propargylated resorcinol (compound A); and
  pentaerythritol tetrakis(3-mercaptopropionate) (PETMP) as compound B.
  1.1—Preparation of the Resins:
  *Preparation of Propargylated Resorcinol:
  Propargylated resorcinol is prepared according to a protocol based on that described in reference [1] above.
  To this end, 100 g of resorcinol (SIGMA-ALDRICH) are solubilized in 1.7 L of N,N-dimethylformamide (DMF) to which 1.27 kg of potassium carbonate ($K_2CO_3$) are added with mechanical stirring. Then, 115 mL of propargyl bromide in 80% solution in toluene is added to the solution. Mechanical agitation is maintained for 12 hours. After filtration and dilution in ethyl acetate, the medium is washed 3 times with brine and twice with deionized water. The organic phase is dried over anhydrous magnesium sulfate ($MgSO_4$), filtered and concentrated under reduced pressure. 156 g of resorcinol propargylated, denoted 5 in FIG. 15, are thus obtained (yield: 92%).

*Prepolymerization of Propargylated Resorcinol:

50 g of the propargylated resorcinol obtained above are introduced into a two-necked 250 ml flask containing a magnetic bar. The flask is surmounted by a water cooler. The medium is subjected to a heat treatment comprising steps of 2 hours at 180° C. separated from each other by a return to ambient temperature under a stream of nitrogen. After 10 stages at 180° C., a viscous material, which is fluidized by raising the temperature, is obtained and which corresponds to a mixture of resorcinol propargyl prepolymers (yield: 100%).

*Mixture of Propargylated Resorcinol Prepolymers and PETMP:

Five resins, hereinafter called R1, R2, R3, R4 and R5 resins, are prepared by adding the mixture of propargylated resorcinol prepolymers obtained above to PETMP (available from SIGMA-ALDRICH), with simple manual stirring and prepolymer ratios of propargylated resorcinol/PETMP of 95/5, 90/10, 85/15, 80/20 and 75/25 respectively.

Figure 1:
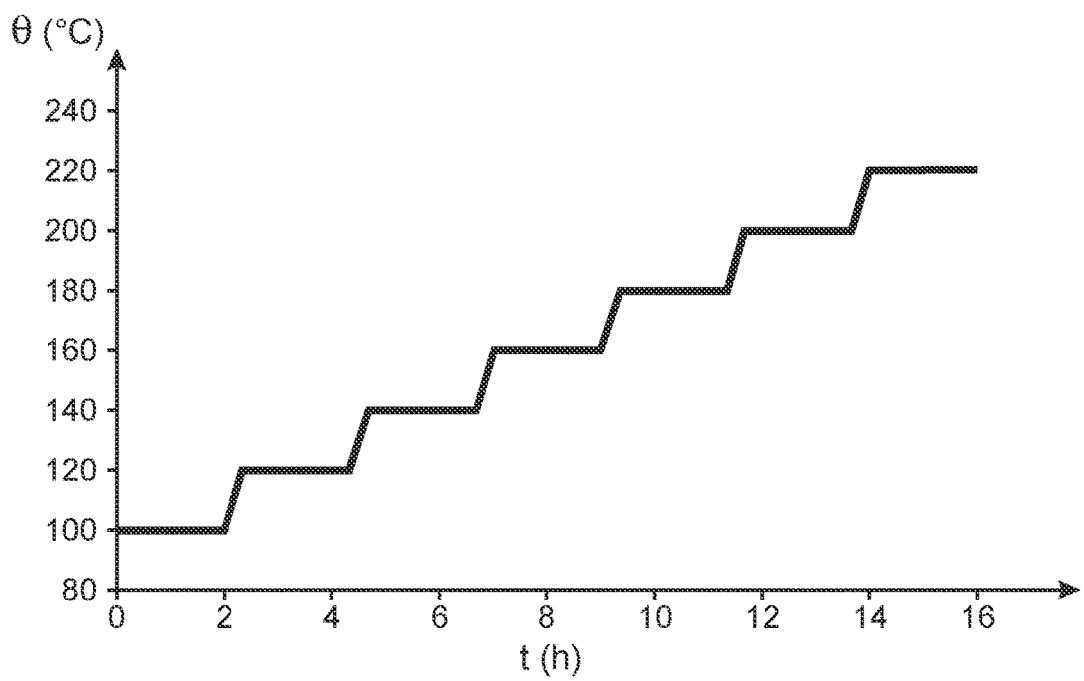
FIG. 1 illustrates the conditions of the heat treatment that has been applied to resins according to the invention for their curing in the experiments which are reported in Examples 1 to 4 which follow; the temperature, denoted θ and expressed in ° C., is indicated on the ordinate axis while the time, denoted t and expressed in hours, is indicated on the abscissa axis.

1.2—Curing of the Resins:

For their curing, samples of the resins R1 to R5 are placed in an oven previously heated to 100° C. and subjected to the heat treatment whose conditions modalities are illustrated in FIG. 1.

As visible in this figure, this heat treatment comprises 7 stages located respectively at 100° C., 120° C., 140° C., 160° C., 180° C., 200° C. and 220° C., each of 2 hours and separated from each other by a rise in temperature of 1° C./minute.

1.3—Coke Rate after Curing:

The coke rates of the resins R1 to R5 after curing are determined by a TGA which is carried out using a TA Instruments Q500 thermogravimetric analyzer and by applying to samples of these cured resins a rise in temperature between room temperature and 900° C., at 5° C. per minute and under nitrogen flow.

For each resin, the coke rate corresponds to the residual mass presented by the sample of this resin at the end of the TGA, expressed as a percentage of the mass initially presented by this sample.

Figure 2:
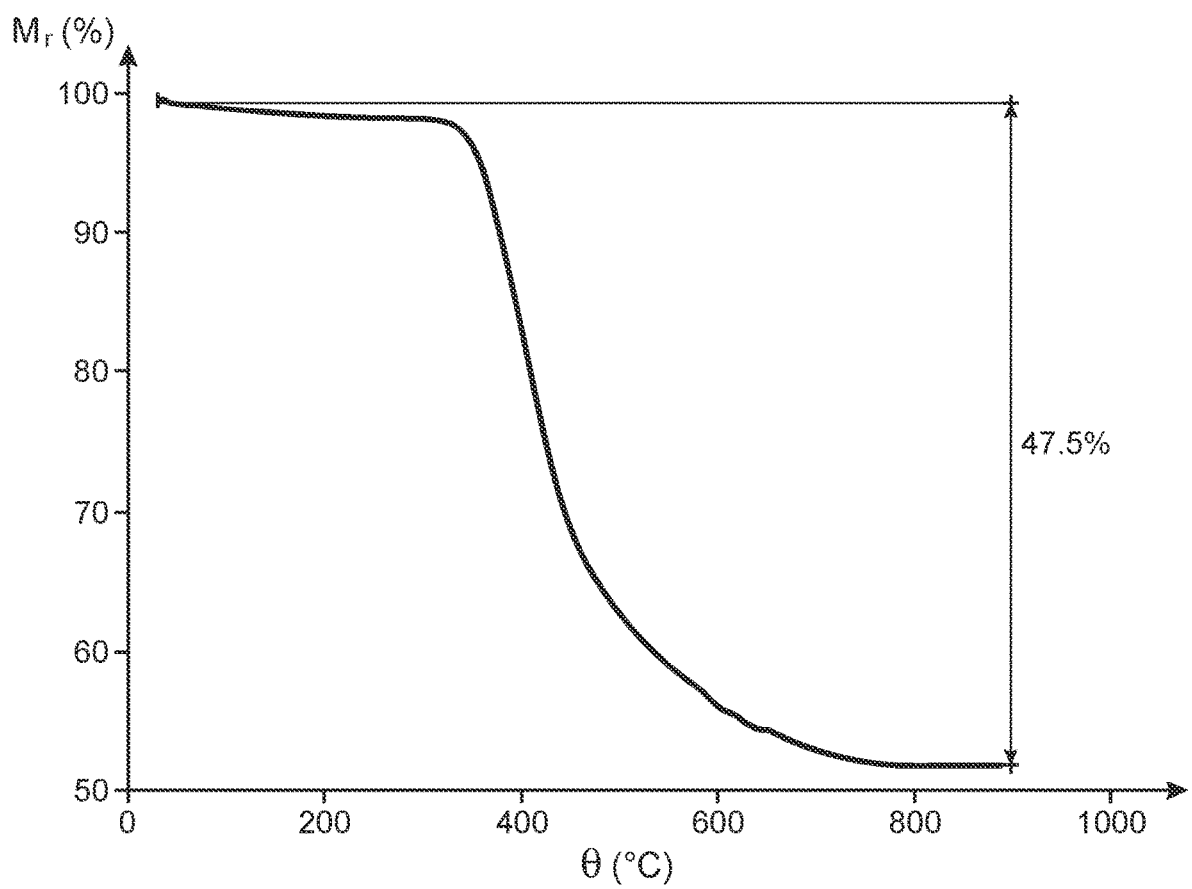
FIG. 2 illustrates the thermogravimetric analysis curve (or TGA curve) obtained for a sample of a first resin according to the invention—hereinafter called resin R4—after curing; the residual mass of the sample, denoted $M_r$ and expressed in % of the initial mass, is indicated on the ordinate axis while the temperature, denoted θ and expressed in ° C., is indicated on the abscissa axis.

The coke rates thus obtained for the resins R1 to R5 after curing are shown in Table I below while the TGA curve obtained for the resin sample R4 is illustrated in FIG. 2.

TABLE I

| Resins | Coke rate |
|---|---|
| R1 (95/5) | 62% |
| R2 (90/10) | 58% |
| R3 (85/15) | 55% |
| R4 (80/20) | 52% |

TABLE I-continued

| Resins | Coke rate |
|---|---|
| R5 (75/25) | 49% |

This table shows that the presence of PETMP up to 20% by mass or less in a resin comprising a mixture of prepolymers of resorcinol propargylated gives a coke rate greater than 50% to the resin after curing.

1.4—Calorimetric Monitoring of Curing:

The influence of the presence of PETMP in the resin R4 on the reactivity of the mixture of propargylated resorcinol prepolymers is assessed by a DSC analysis which is carried out using a Q100 calorimeter from TA Instruments and by subjecting a sample of the uncured R4 resin at a temperature rise between 0° C. and 300° C., at 3° C./minute and under nitrogen flow.

Figure 3:
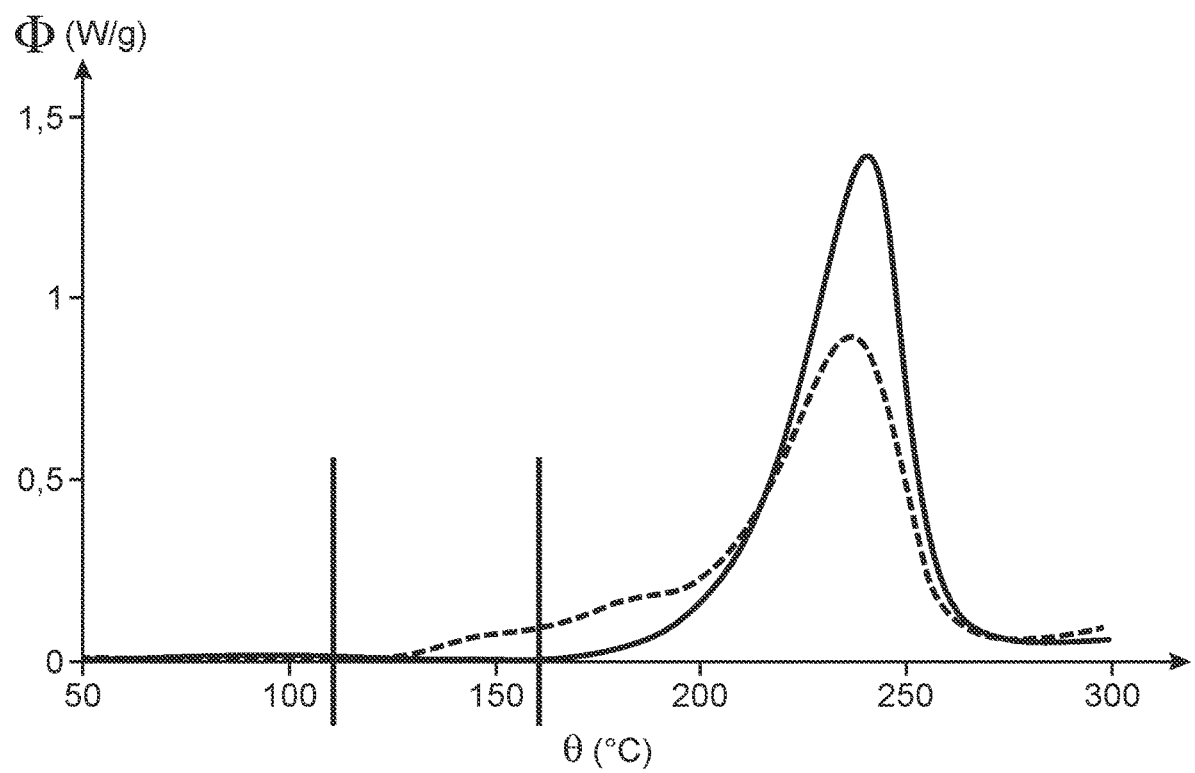
FIG. 3 illustrates the differential scanning calorimetry curve (or DSC curve) obtained during curing of a sample of the R4 resin (dashed line); for comparison, also shown is the DSC curve obtained, under the same conditions, during the curing of a control sample, which differs from the sample of the resin R4 only in that it does not include the compound B (curve in solid line); the heat flux, denoted Φ and expressed in W/g, is indicated on the ordinate axis while the temperature, denoted θ and expressed in ° C., is indicated on the abscissa axis.

The DSC curve obtained for this sample is illustrated in FIG. 3 (dashed curve). By way of comparison, this figure also shows in the DSC curve obtained, under the same conditions, a control sample comprising the same mixture of propargylated resorcinol prepolymers as the resin R4 but free of PETMP.

This figure shows that the presence of PETMP at a level of 20% by mass in the resin R4 allows the polymerization/crosslinking of the mixture of prepolymers of propargylated resorcinol:

(1) to start at a lower temperature: 110° C. versus 160° C.;
(2) to take place in a wider temperature range: 110-270° C. versus 160° C.-280° C.; and
(3) to have a lower enthalpy: 770 J/g versus 880 J/g.

The presence of PETMP at a level of 20% by mass in the resin R4 thus allows better control of the reactivity of the mixture of propargylated resorcinol prepolymers and a less violent course of the polymerization/crosslinking of this mixture of prepolymers.

1.5—No Runaway During Curing:

No runaway was observed during the curing of resins R1 to R5.

On the other hand, the curing of resins comprising the same mixture of propargylated resorcinol prepolymers as resins R1 to R5 but free of PETMP resulted in runaway, in which case the material chars with strong smoke release.

1.6—Loss of Mass During Curing:

The mass lost by the resin R4 during its curing is determined by subjecting a sample of this resin to a rise in temperature between 100 and 220° C. and comparing the mass of this sample before and after this heat treatment. The mass loss is 10%.

1.7—Glass Transition Temperature:

The glass transition temperature of the resin R4 after curing is determined by a DMA which is carried out by means of a TA Instruments Q800 dynamic mechanical analyzer (simple lever mode, frequency of 1 Hz, amplitude of 30 μm) and by subjecting a parallelepipedic sample (17.5 mm×2 mm×10 mm) of the cured resin R4 to a temperature rise between 0° C. and 350° C. at a rate of 3° C./minute.

Figure 4:
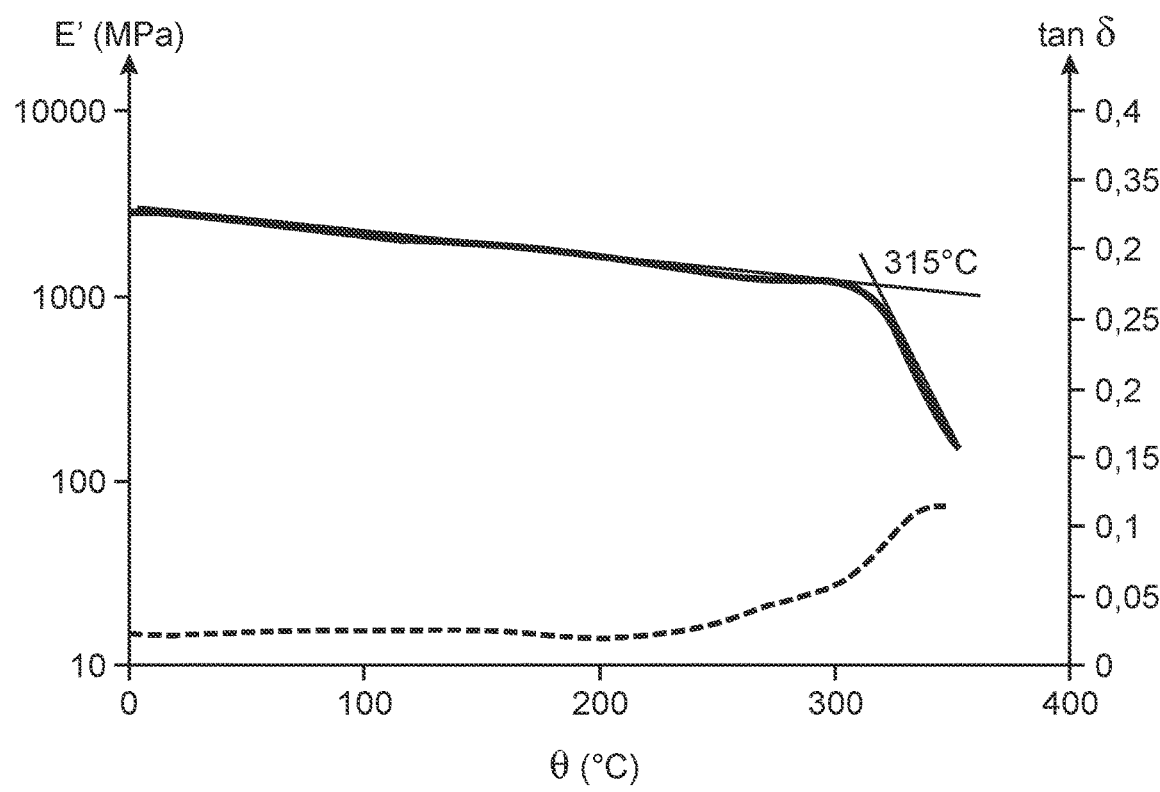
FIG. 4 illustrates the conservation module curve, denoted E' and expressed in MPa (solid line curve), and the curve of the loss factor or tan δ (dashed curve) as obtained by dynamic mechanical analysis (or DMA) for a sample of the R4 resin after curing; the conservation modulus and the tan δ are indicated on the ordinate axes, respectively of left and right, while the temperature, denoted θ and expressed in ° C., is indicated on the abscissa axis.

The results of this analysis are illustrated in FIG. 4 which shows the conservation modulus curve (solid curve) and the curve of the loss factor or tan δ (dashed curve) obtained for this sample as a function of temperature.

As shown in this figure, the drop of the conservation modulus of the cured resin R4 occurs at 315° C. The glass transition temperature of this resin is therefore 315° C.

1.8—Rheological Characteristics Before Curing:

Samples of the uncured resin R4 are subjected to rheological measurements which are carried out by means of an ARES rheometer from TA Instruments (cone/plane geometry Ø=50 mm, air gap=50 µm) equipped with a calibration system. Peltier effect temperature control (APS from TA Instruments).

Figure 5:
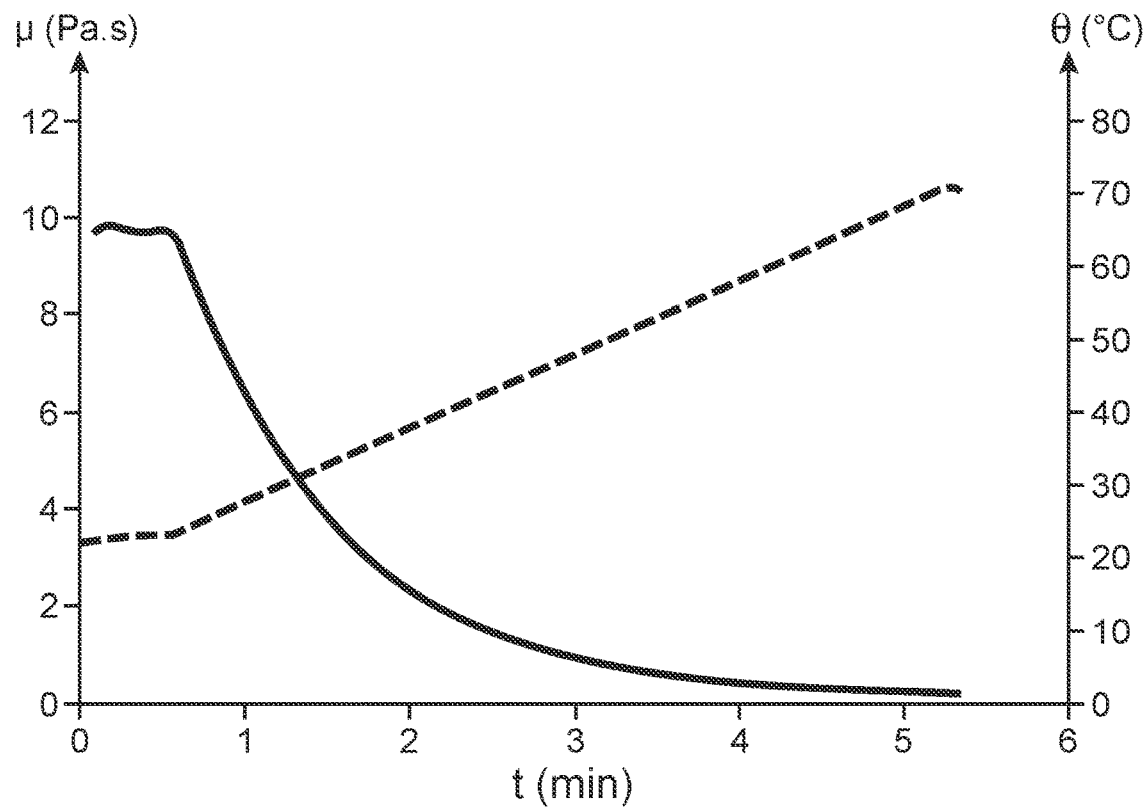
FIG. 5 illustrates the evolution of the dynamic viscosity, denoted μ and expressed in Pa.s (solid line curve), of the resin R4, as a function of the temperature, denoted θ and expressed in ° C. (dashed curve).
Figure 6:
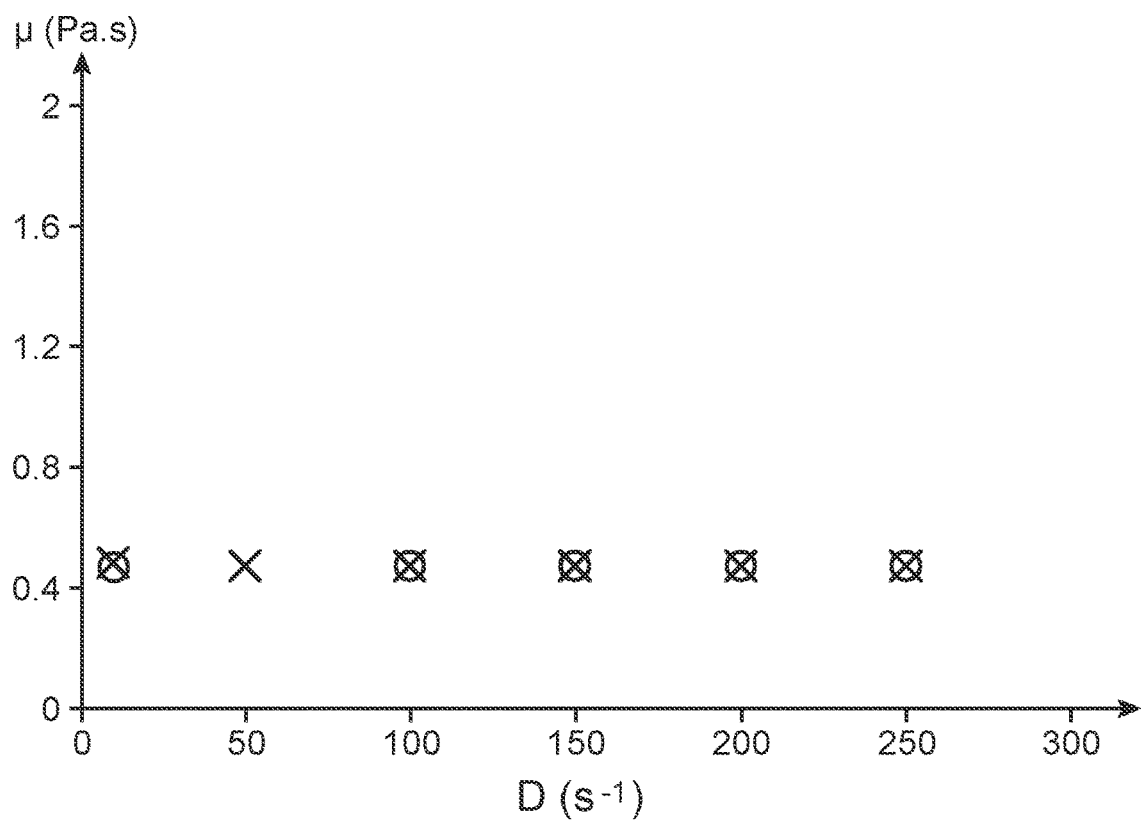
FIG. 6 illustrates the evolution of the dynamic viscosity, denoted μ and expressed in Pa.s, of the resin R4, as measured at the temperature of 55° C., as a function of the shear rate, denoted D and expressed in $s^{-1}$, which has been applied to it during a charge cycle (x) and a discharge cycle (o).
Figure 7:
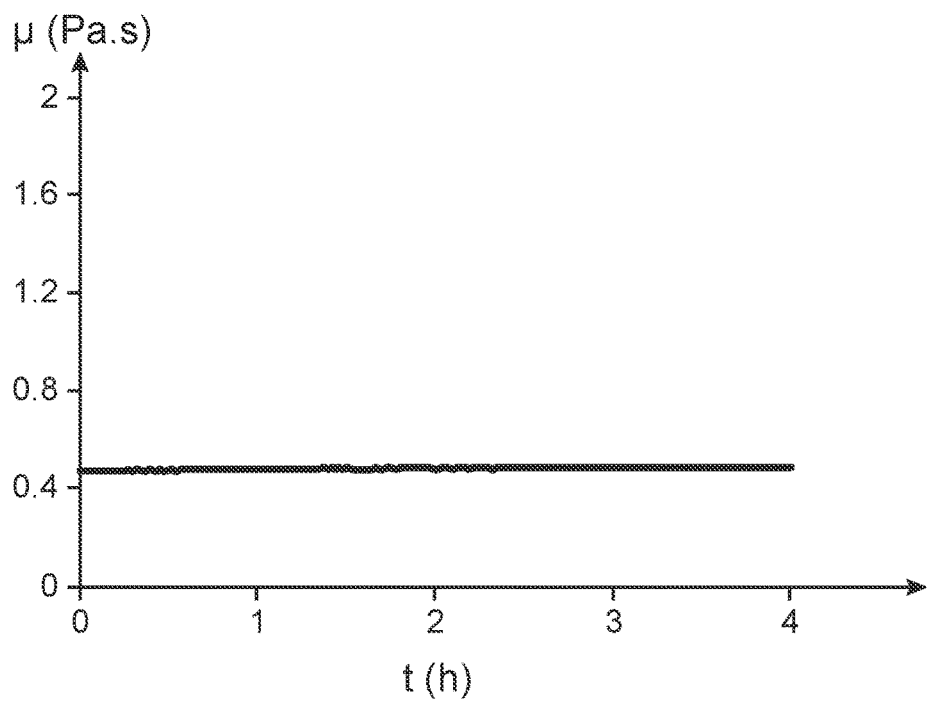
FIG. 7 illustrates the evolution of the dynamic viscosity, denoted μ and expressed in Pa.s, of the resin R4, as determined at the temperature of 55° C. and for a shear rate of 10 $s^{-1}$, as a function of the time, denoted t and expressed in hours.

The results of these measurements are illustrated in FIGS. 5 to 7 which show:

FIG. 5: the evolution of the dynamic viscosity of the resin R4 (curve in solid line) as a function of the temperature (dashed curve);

FIG. 6: the evolution of the dynamic viscosity of the resin R4 at constant temperature (55° C.) as a function of the shear rate, during a charge cycle (x) and a discharge cycle (o);

FIG. 7: the evolution of the dynamic viscosity of the resin R4 at constant temperature (55° C.) and constant shear rate ($10 \ s^{-1}$) as a function of time.

These figures show:
- on the one hand, that the dynamic viscosity of the resin R4 is less than 2 Pa.s above 39° C. (FIG. 5);
- on the other hand, that the resin R4 has a Newtonian behavior, i.e. that its dynamic viscosity is independent of the shear rate (FIG. 6); and
- finally, that the dynamic viscosity of the resin R4 is very stable over time and may be maintained at a value of less than 2 Pa.s for at least 4 hours at a temperature which is below 80° C. (FIG. 7), which makes it possible to envisage a use of this resin in methods for manufacturing composite materials by impregnation without the use of organic solvents.

EXAMPLE 2

Preparation and Characteristics of a Second Kind of Curable Resin According to the Invention The present example relates to a second type of resin according to the invention, which comprises:
- a mixture of prepolymers obtained by prepolymerization of resorcinol propargylated (compound A); and
- thiolated resorcinol as compound B.

Figure 8:
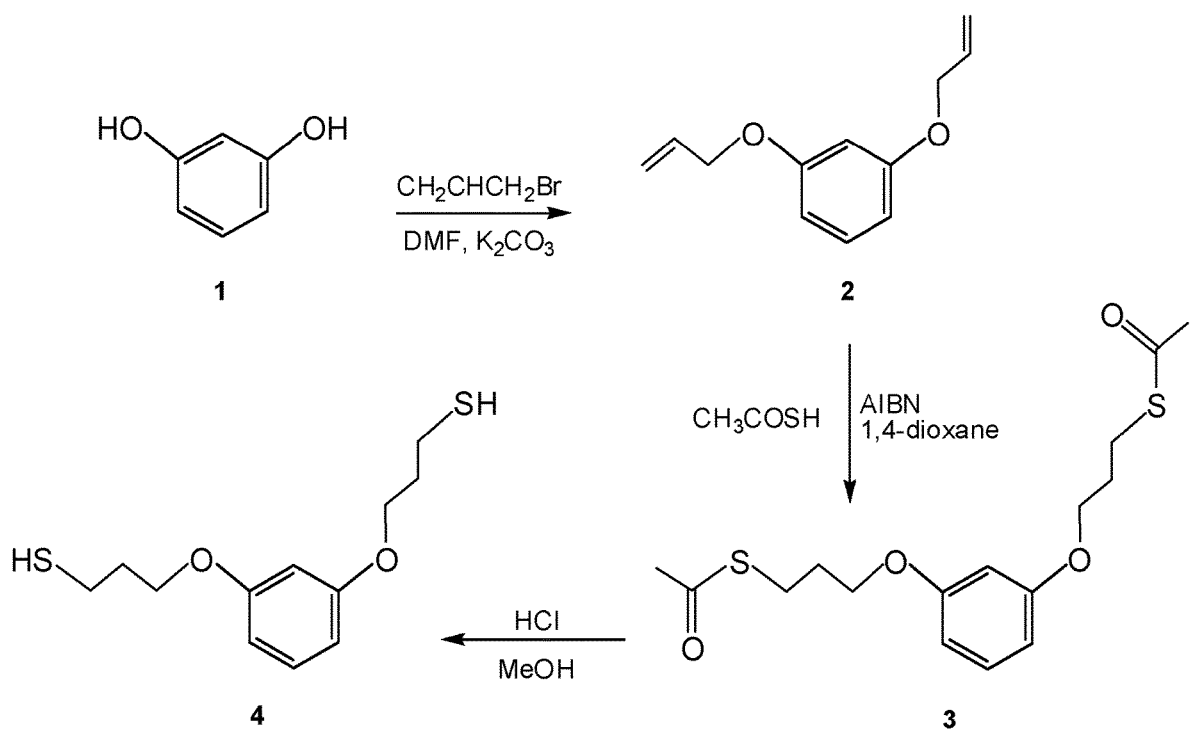
FIG. 8 illustrates the reaction scheme that has been followed for the preparation of a thiolated resorcinol which is reported in Example 2 below.

2.1—Preparation of the Resin:

The mixture of propargylated resorcinol prepolymers is prepared as described in point 1.1 of Example 1 above while the thiolated resorcinol is prepared according to the reaction scheme illustrated in FIG. 8, which is based on that described in reference [5] above.

*Preparation of Thiolated Resorcinol:

As may be seen in FIG. 8, the first step of this preparation consists in subjecting resorcinol, denoted 1, to an allylation reaction.

To this end, 11.61 g of resorcinol are solubilized in 465 ml of DMF in a 2.5 L reactor whose contents are stirred mechanically. Then, 150 g of $K_2CO_3$ and 19 ml of allyl bromide are added successively to the medium. The reaction takes place over 12 hours at room temperature. The reaction medium is then diluted in ethyl acetate and filtered. The washing is carried out by extraction with brine and permuted water. The organic phase is dried over anhydrous $MgSO_4$ and concentrated under reduced pressure. 13.18 g of the compound denoted 2 in FIG. 8 are thus obtained (yield: 66%).

The second step is to subject the compound 2 to a radical addition reaction with thioacetic acid to replace the allyl groups with thioester groups.

To this end, 13.06 g of compound 2 and 5.56 g of azobisisobutyronitrile (AIBN) are solubilized in 59 ml of 1,4-dioxane. The medium is degassed for 40 minutes by bubbling argon in the medium. Excess thioacetic acid (18 mL) is added to the medium left under argon. The temperature is raised to 63° C. After 24 hours of stirring and return to ambient temperature, the medium is diluted in diethyl ether. The organic phase is washed with a solution of saturated sodium bicarbonate ($NaHCO_3$), with brine and finally with deionized water. After evaporation of the diethyl ether, 15.52 g of the compound denoted 3 in FIG. 8 are obtained in the form of white crystals (yield: 66%).

The third step consists of subjecting the compound 3 to solvolysis in an aqueous-alcoholic medium to transform the two thioester groups into thiol groups.

To do this, 15.50 g of compound 3 are introduced into a 250 ml two-neck flask surmounted by a water cooler. Then, 150 ml of methanol and 18 ml of concentrated hydrochloric acid (HCl) are added to the flask. The medium is placed under magnetic stirring and the temperature is raised to 70° C. for 3 hours. After returning to ambient temperature, 200 mL of chloroform and 200 mL of deionized water are added to the medium. The aqueous phase is extracted 4 times with 200 mL of chloroform. The organic phase fractions are combined and concentrated under reduced pressure.

Thus 8.19 g of a product are obtained (yield: 70%), whose infrared spectrum (which shows the absence of the absorption band of the resorcinol —OH groups and the appearance of a signal at 2565 $cm^{-1}$ indicating the presence of —SH groups), elemental analysis (calculated: 55.8% C, 7.02% H, 24.8% S found: 55.6% C, 7.21% H, 24.8% S) and the $^{13}C$ and $^1H$ NMR spectra confirm that it is indeed thiolated resorcinol, denoted 4 in FIG. 8.

*Mixture of Propargylated Resorcinol Prepolymers and Thiolated Resorcinol:

A resin, hereinafter referred to as resin R6, is prepared by adding the mixture of propargylated resorcinol prepolymers and thiolated resorcinol with manual stirring and in a mass ratio allowing the introduction of a quantity of thiol groups identical to that present in the resin R4 of Example 1 above, which gives a mass ratio of propargylated resorcinol prepolymers/thiolated resorcinol of 79/21.

2.2—Curing of the Resin:

The curing of the resin R6 is carried out under conditions identical to those described in point 1.2 of Example 1 above.

2.3—Coke Rate after Curing:

The coke rate of the resin R6 after curing is determined by subjecting a sample of this cured resin to TGA which is carried out under conditions identical to those described in point 1.3 of Example 1 above.

Figure 9:
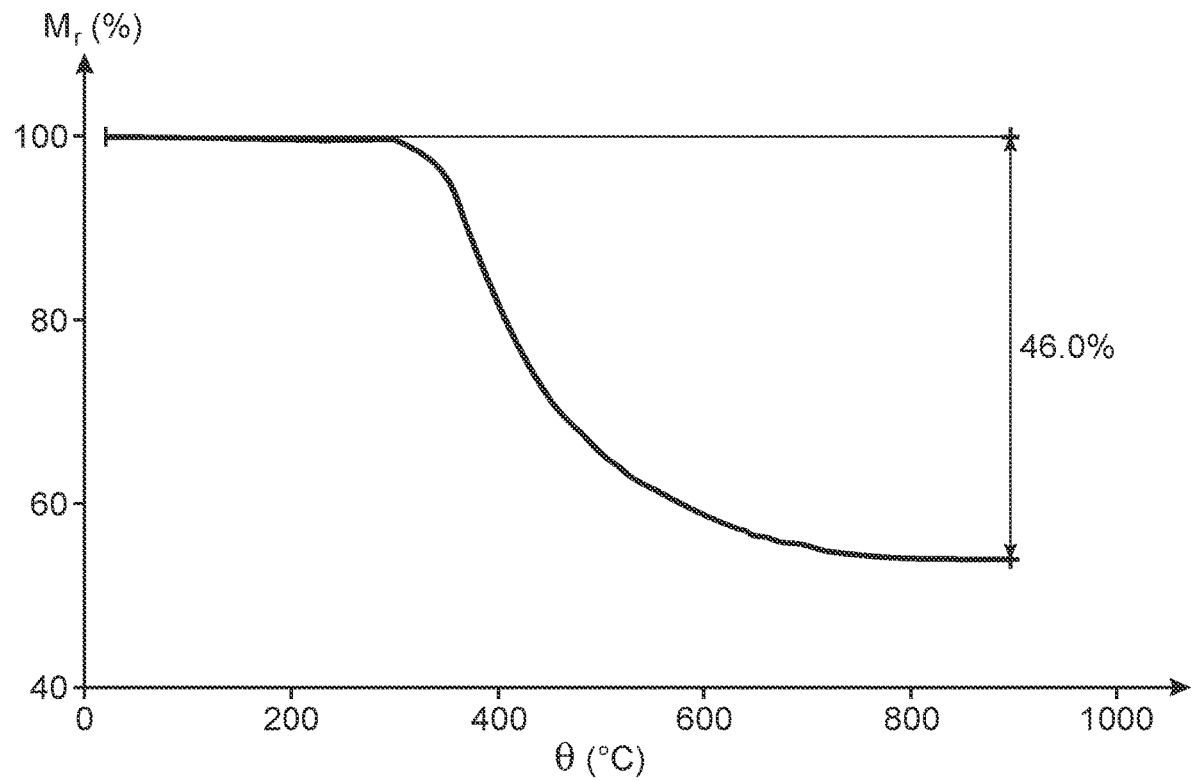
FIG. 9 illustrates the TGA curve obtained for a sample of a second resin according to the invention—hereinafter called resin R6—after curing; the residual mass of the sample, denoted $M_r$ and expressed in % of the initial mass, is indicated on the ordinate axis while the temperature, denoted θ and expressed in ° C., is indicated on the abscissa axis.

The TGA curve obtained for the resin R6 sample is illustrated in FIG. 9.

This figure shows that the coke rate of the resin R6 is 54%.

2.4—Calorimetric Monitoring of Curing:

The influence of the presence of thiolated resorcinol in the resin R6 on the reactivity of the mixture of resorcinol propargylated prepolymers may be appreciated by subjecting a sample of uncured resin R6 to a DSC analysis which is carried out under conditions identical to those described in point 1.4 of Example 1 above.

Figure 10:
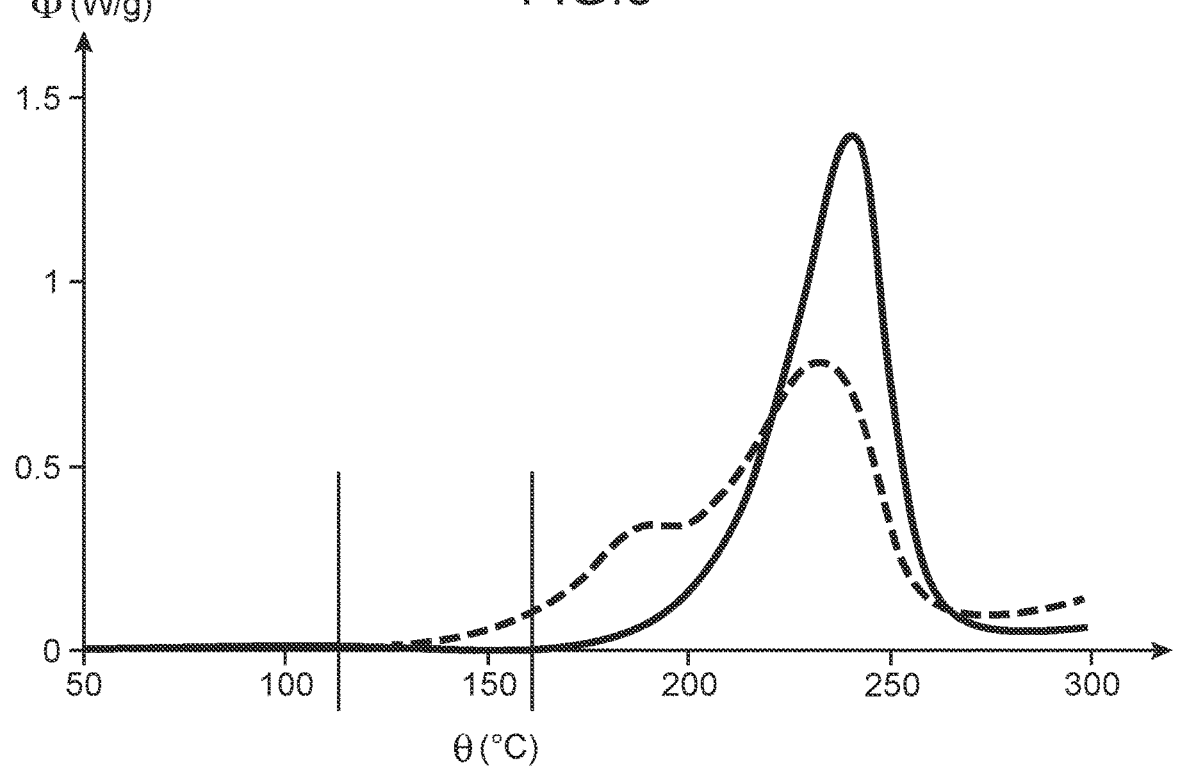
FIG. 10 illustrates the DSC curve obtained during curing of a sample of resin R6 (dashed line); for comparison, also shown is the DSC curve obtained under the same conditions, during the curing of a control sample, which differs from the sample of the resin R6 only in that it does not include the compound B (curve in solid line); the heat flux, denoted Φ and expressed in W/g, is indicated on the ordinate axis while the temperature, denoted θ and expressed in ° C., is indicated on the abscissa axis.

The DSC curve obtained for this sample is illustrated in FIG. 10 (dashed curve). By way of comparison, this figure also shows the DSC curve obtained, under the same conditions, for a control sample comprising the same mixture of propargylated resorcinol prepolymers as the resin R6 but free of thiolated resorcinol.

This figure shows that the presence of thiolated resorcinol at 21% by mass in the resin R6 produces the same effects as those produced by the presence of PETMP in the resin R4.

The presence of thiolated resorcinol at 21% by mass in the resin R6 thus allows better control of the reactivity of the mixture of propargylated resorcinol prepolymers and a less violent course of the polymerization/crosslinking of this mixture of prepolymers.

2.5—No Runaway During Curing:

No runaway was observed during the curing of the R6 resin.

2.6—Loss of Mass During Curing:

The mass lost by the resin R6 during its curing is determined under the same conditions as those previously described in point 1.6 of Example 1 above. The mass loss is 12%.

2.7—Glass Transition Temperature:

The glass transition temperature of the resin R6 after curing is determined by subjecting a sample of this cured resin to a DMA which is carried out under the same conditions as those previously described in point 1.7 of Example 1 above.

Figure 11:
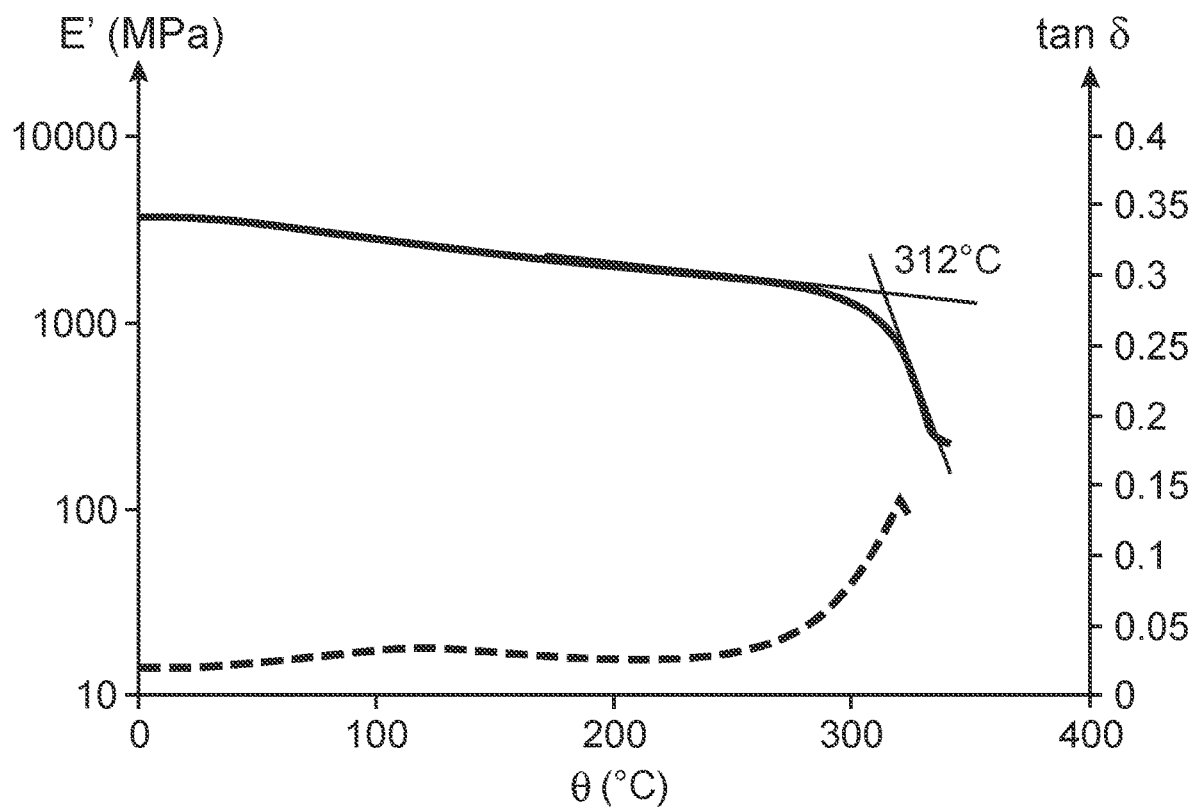
FIG. 11 illustrates the conservation modulus curve, denoted E' and expressed in MPa (solid line curve), and the curve of the loss factor or tan δ (dashed curve) as obtained by DMA for a sample of the resin R6 after curing; the conservation modulus and the tan δ are indicated on the ordinate axes, respectively of left and right, while the temperature, denoted θ and expressed in ° C., is indicated on the abscissa axis.

The results of this analysis are illustrated in FIG. 11 which shows the conservation modulus curve (solid curve) and the curve of the loss factor or tan δ (dashed curve) obtained for this sample as a function of temperature.

This figure shows that the drop of the conservation modulus of the cured resin R6 occurs at 312° C. The glass transition temperature of this resin is therefore 312° C.

.2.8—Rheological Characteristics Before Curing:

Samples of the uncured resin R6 are subjected to rheological measurements which are carried out using the same apparatus as that described in point 1.8 of Example 1 above.

Figure 12:
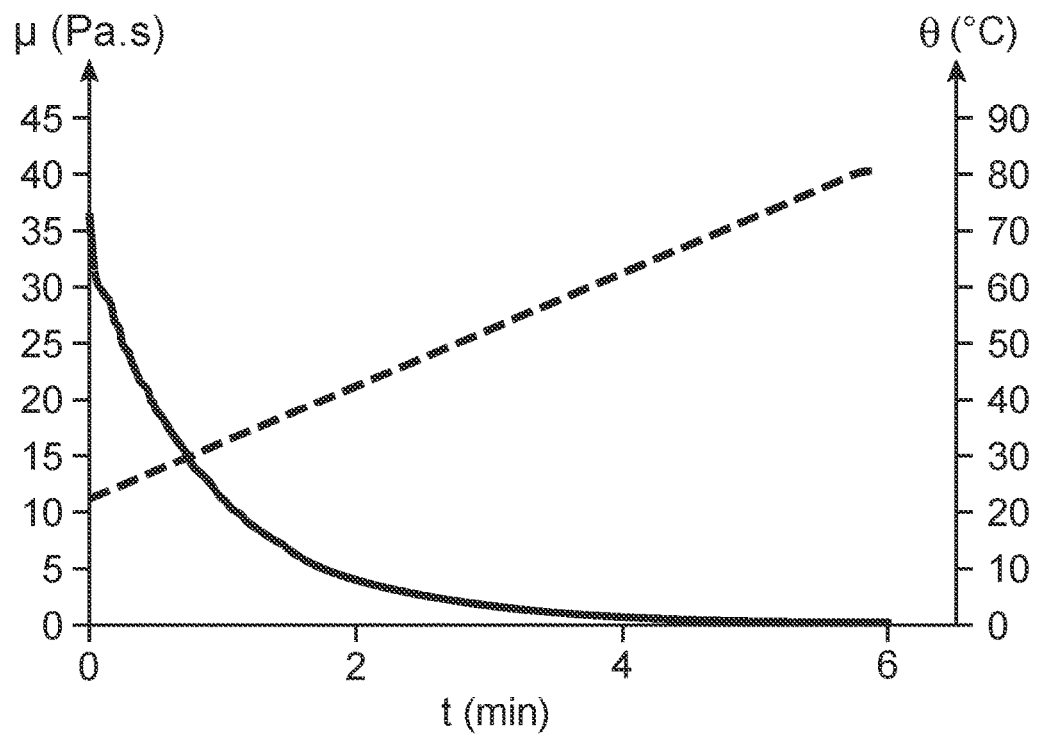
FIG. 12 illustrates the evolution of the dynamic viscosity, denoted μ and expressed in Pa.s (solid curve), of the resin R6, as a function of the temperature, denoted θ and expressed in ° C. (dashed curve).
Figure 13:
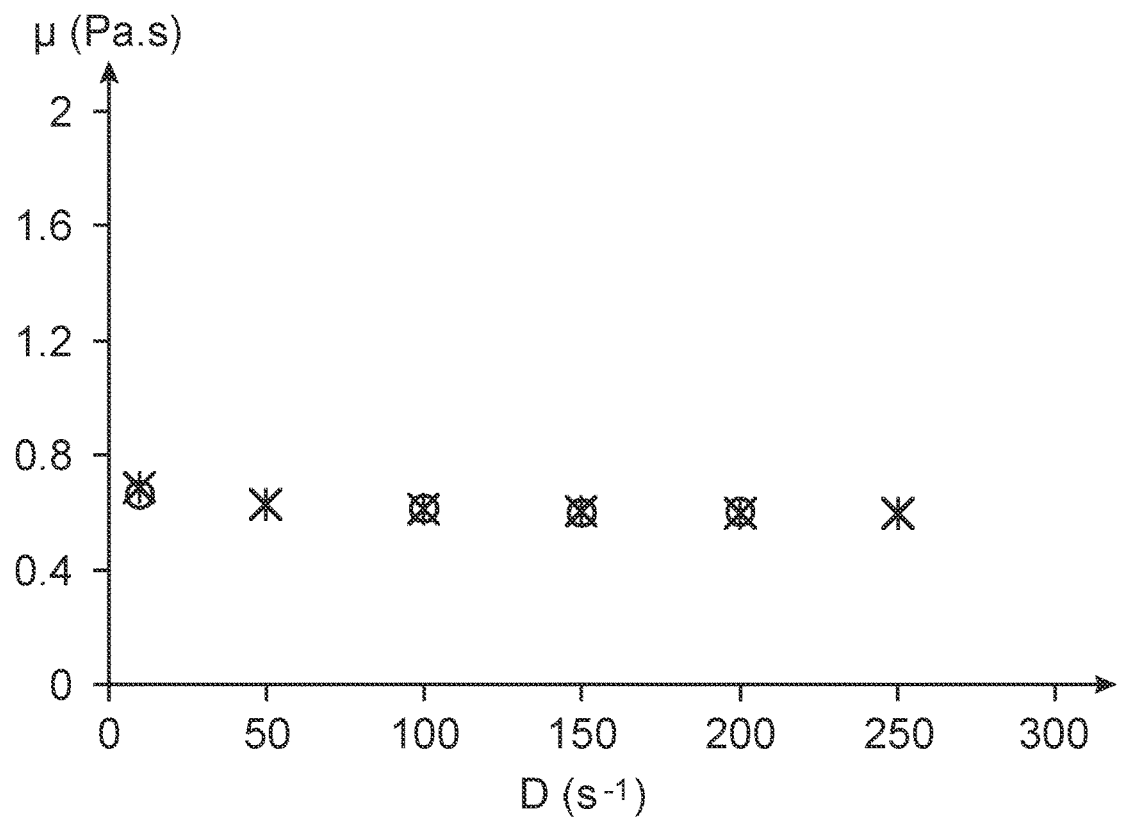
FIG. 13 illustrates the evolution of the dynamic viscosity, denoted μ and expressed in Pa.s, of the resin R6, as measured at the temperature of 65° C., as a function of the shear rate, denoted D and expressed in terms of $s^{-1}$, applied to it during a charge cycle (x) and a discharge cycle (o).
Figure 14:
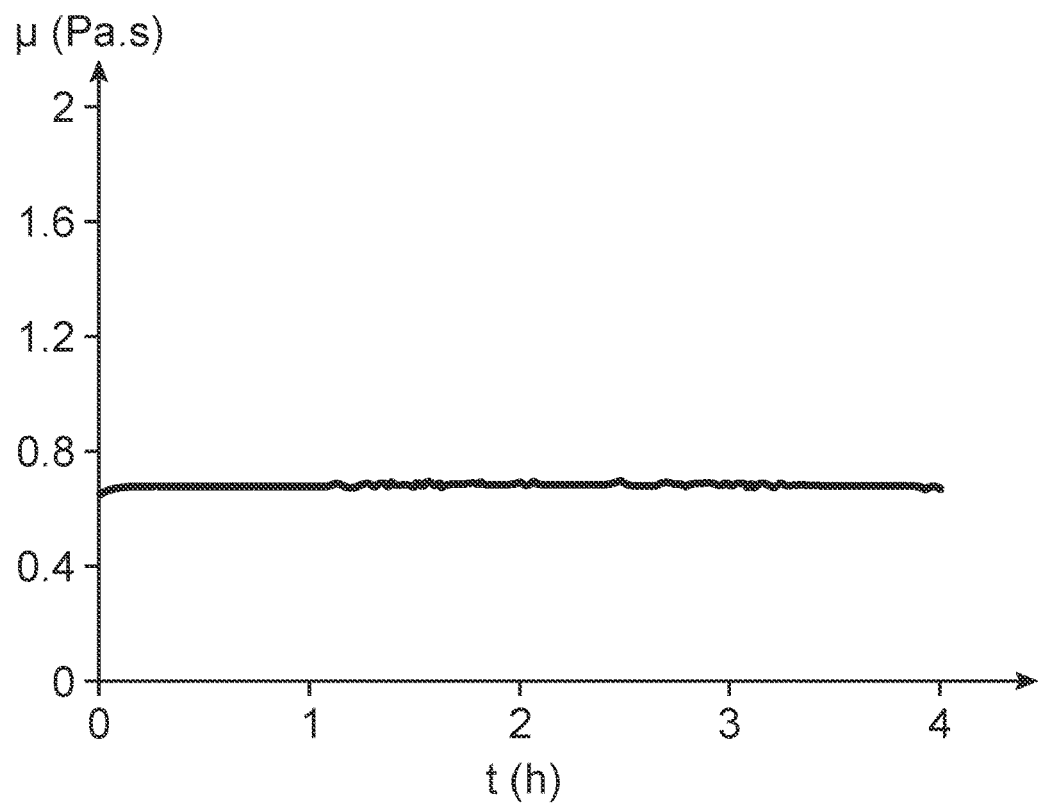
FIG. 14 illustrates the evolution of the dynamic viscosity, denoted μ and expressed in Pa.s, of the resin R6, as determined at the temperature of 65° C. and for a shear rate of 10 $s^{-1}$, as a function of time, denoted t and expressed in hours.

The results of these measurements are illustrated in FIGS. 12 to 14 which show:

FIG. 12: the evolution of the dynamic viscosity of the resin R6 (curve in solid lines) as a function of the temperature (dashed curve);

FIG. 13: the evolution of the dynamic viscosity of the resin R6 at constant temperature (65° C.) as a function of the shear rate, during a charge cycle (x) and a discharge cycle (o);

FIG. 14: the evolution of the dynamic viscosity of the resin R6 at constant temperature (65° C.) and constant shear rate (10 s$^{-1}$) as a function of time.

These figures show:
- on the one hand, that the dynamic viscosity of the resin R6 is less than 2 Pa.s above 51° C. (FIG. 12);
- on the other hand, that the resin R6 has a Newtonian behavior (FIG. 13); and
- finally, that the dynamic viscosity of the resin R6 is very stable over time and may be maintained at a value of less than 2 Pa.s for at least 4 hours at a temperature which is below 80° C. (FIG. 14).

EXAMPLE 3

Preparation and Characteristics of a Third Kind of Curable Resin According to the Invention The present example relates to a third type of resin according to the invention, which comprises:
- a mixture of prepolymers obtained by prepolymerization of propargylated resorcinol (compound A); and
- a thiolated lignin as compound B.

3.1—Preparation of the Resin:

The mixture of propargylated resorcinol prepolymers is prepared as described in point 1.1 of Example 1 above while the thiolated lignin is prepared following a protocol based on that described in reference [5] above.

*Preparation of Thiolated Lignin:

The first step of this preparation is to subject a lignin to an allylation reaction.

To do this, 40 g of a lignin (Kraft Indulin AT lignin) are solubilized in 800 ml of a solution of sodium hydroxide (NaOH) at 0.5 mol/L in a reactor equipped with a lid allowing the passage of a stirring blade and the installation of a water cooler. Then 62 ml of allyl bromide are added and the temperature of the medium is raised to 60° C. for 4 hours. After stopping the stirring, the majority of the allylated lignin is in the form of sediments while the still dispersed allyl lignin may be recovered by centrifugation. The allylated lignin thus obtained is then washed with osmosis water until neutrality of the washing water. It is then lyophilized.

The infrared spectrum of this lignin shows a decrease in the signal associated with the —OH groups at 3450 cm$^{-1}$ and the appearance of a new absorption band at 3078 cm$^{-1}$ corresponding to the functionalization of part of the lignin —OH groups by allyl groups (—CH$_2$—CH=CH$_2$).

$^{31}$P NMR analysis after derivatization of the lignin with 2-chloro-4,4,5,5-tetramethyl-1,3,2-dioxaphospholane (TMDP) indicates that the aromatic —OH groups of the lignin were quasi-quantitatively functionalized: 3.7 mmol of aromatic —OH groups/g of lignin before allylation versus 0.4 mmol of remaining aromatic —OH groups/g of lignin after allylation.

The second step is to subject the allylated lignin to a radical addition reaction with thioacetic acid in order to replace the allyl groups in thioester groups.

To this end, 10 g of dried allylated lignin are solubilized in 50 ml of 1,4-dioxane using a vortex mixer. Then, 2 g of AIBN are solubilized in 21 ml of 1,4-dioxane and added to the allylated lignin solution. Oxygen is removed from the reaction chamber by bubbling argon in the solution for 40 minutes. After addition of 20 ml of thioacetic acid, the medium is heated to 70° C. for 24 hours under an inert atmosphere. The product is then recovered by precipitation in a large volume of diethyl ether, filtered and immediately dispersed in a saturated solution of NaHCO$_3$. The thioesterified lignin thus obtained is washed to neutrality of the washing water and freeze-dried.

The infrared spectrum of this lignin shows the disappearance of the signal at 3078 cm$^{-1}$ and the appearance of a very intense aborption band at 1689 cm$^{-1}$ corresponding to the presence of the thioester groups.

The third step is to subject the thioesterified lignin to deprotection to convert the thioester groups to thiol groups.

To do this, 8.16 g of this lignin are solubilized in 75 ml of DMF with vortex stirring. The solution is degassed by bubbling argon in the medium. Then, 3.3 mL of acetic acid and 2.8 mL of hydrazine monohydrate are introduced successively and dropwise. After stirring for 1 hour, the thiolated lignin may be precipitated in a large volume of water and washed with osmosis water.

The infrared spectrum of this lignin shows the disappearance of the signal centered at 1689 cm$^{-1}$ as well as the appearance of an absorption band at 2564 cm$^{-1}$ attributed to the presence of thiol groups. Elemental analysis indicates that the mass percentage of sulfur is 11% versus 1.5% for raw lignin before any modification.

*Mixture of Propargylated Resorcinol Prepolymers and Thiolated Lignin:

A resin, hereinafter referred to as R7 resin, is prepared by adding the mixture of propargylated resorcinol prepolymers to the thiolated lignin, with simple manual stirring and in a mass ratio of prepolymers of resorcinolpropargylated/thiolated lignin of 86/14.

3.2—Curing of the Resin:

The curing of the resin R7 is carried out under conditions identical to those described in point 1.2 of Example 1 above.

3.3—Characteristics of the Resin:

The resin R7 is subjected to analyses to determine its coke rate after curing, its loss of mass during curing and its glass transition temperature, which is carried out in the same way as described in points 1.3, 1.6 and 1.7. of Example 1 above.

The results are shown in Table II below.

TABLE II

| Coke rate | 62% |
|---|---|
| Loss of mass | 4% |
| Glass transition temperature | >330° C. |

EXAMPLE 4

Preparation and Characteristics of a Fourth Type of Curable Resin According to the Invention The present example relates to a fourth type of resin according to the invention, which comprises:
a mixture of prepolymers obtained by prepolymerization of propargylated resorcinol (compound A);
PETMP as compound B; and
a propargylated lignin as compound C.

4.1—Preparation of the Resin:

The mixture of propargylated resorcinol prepolymers is prepared as described in point 1.1 of Example 1 above while the propargylated lignin is prepared as described below.

*Preparation of Propargylated Lignin:

20.1 g of lignin (Kraft Indulin AT lignin) are solubilized in 400 ml of a 0.5 mol/l NaOH solution. Then 22 ml of propargyl bromide in 80% solution in toluene are added to the solution and the temperature of the medium is raised and maintained at 75° C. for 4 hours. The propargylated lignin is then recovered by centrifugation and washed with osmosis water until neutrality of the washing water. It is then lyophilized.

The infrared spectrum of this lignin, denoted 6 in FIG. 15, shows the appearance of the characteristic signals of the alkyne function at 3283 cm$^{-1}$ and 2120 cm$^{-1}$. A $^{31}$P NMR analysis after derivatisation by the TMDP shows that the aromatic groups of the lignin have been modified in a quasi-quantitative manner: 3.7 mmol of aromatic —OH groups/g of lignin before propargylation versus 0.5 mmol of remaining aromatic —OH groups/g of propargylated lignin.

*Mixture of Propargylated Resorcinol Prepolymers, Propargylated Lignin and PETMP:

A resin, hereinafter referred to as resin R8, is prepared by adding the mixture of propargylated resorcinol prepolymers and propargylated lignin to PETMP after fine grinding of the propargylated lignin to ensure homogeneous dispersion thereof, with simple manual stirring in a mass ratio of propargylated resorcinol prepolymers/PETMP/propargylated lignin of 75/10/15.

4.2—Curing of the Resin:

The curing of the resin R8 is carried out under conditions identical to those described in point 1.2 of Example 1 above.

4.3—Characteristics of the Resin:

The resin R8 is subjected to analyses to determine its coke rate after curing, its mass loss during curing and its glass transition temperature, which is carried out in the same way as described in points 1.3, 1.6 and 1.7. of Example 1 above.

The results are shown in Table III below.

TABLE III

| Coke rate | 58% |
|---|---|
| Loss of mass | 4% |
| Glass transition temperature | >330° C. |

EXAMPLE 5

Preparation of a Propargylated Eugenol Dimer Useful as Compound A According to the Invention

*Preparation of the Eugenol Dimer of Formula (I) Above:

The eugenol dimer is prepared by metathesis of eugenol according to a protocol based on that described in reference [4] above.

To do this, 24 ml of eugenol (SIGMA-ALDRICH) are placed in the presence of 0.530 g of Grubbs first-generation catalyst, under an inert atmosphere and magnetic stirring, at room temperature. Once the medium has become thicker and frozen, the system is placed under reduced pressure (100 kPa) for 48 hours. The solid obtained is solubilized in 1l of a 1 mol/l aqueous NaOH solution and filtered on celite to remove the catalyst. The filtrate is acidified by adding concentrated HCl until precipitation of a pale gray solid. The solid is collected by filtration on a Büchner funnel and washed with deionized water until neutrality of the washing water. The product is then dispersed in a minimum volume of a water-ethanol mixture (50:50 v/v), solubilized by raising the temperature (40° C.) and then placed at 5° C. until precipitation. The solid obtained is filtered on a Büchner funnel and washed with water-ethanol solution. The recovered compound is solubilized in dichloromethane and washed with water. The organic phase is concentrated under reduced pressure to obtain 3.0 g of eugenol dimer (yield: 13%).

*Propargylation of Eugenol Dimer:

1.5 g of the eugenol dimer is solubilized in 24 ml of DMF in which 7.5 g of K$_2$CO$_3$ are introduced with magnetic stirring. Then 1.2 ml of propargyl bromide in 80% solution in toluene are then introduced. Magnetic stirring is maintained for 12 hours. After filtration and dilution in ethyl acetate, the medium is washed 3 times with brine and twice with deionized water. The organic phase is dried over MgSO$_4$, filtered and concentrated under reduced pressure.

There is thus obtained 1.62 g of propargylated eugenol dimer, denoted 7 in FIG. 15 (yield: 86%).

EXAMPLE 6

Preparation of Propargylated Gallic Acid Useful as Compound A According to the Invention 5.0 g of gallic acid (SIGMA-ALDRICH) are solubilized in 317 ml of DMF in which 101 g of K$_2$CO$_3$ are introduced with magnetic stirring. Then, 32.7 mL of propargyl bromide in 80% solution in toluene is added to the solution. Magnetic stirring is maintained for 12 hours. After filtration and dilution in ethyl acetate, the medium is washed 3 times with brine and twice with deionized water. The organic phase is dried over MgSO$_4$, filtered and concentrated under reduced pressure.

7.4 g of propargylated gallic acid, denoted 8 in FIG. 15 are thus obtained (yield: 78%).

REFERENCES CITED

[1] M. C. Joshi et al., *Bioorg. Med. Chem. Lett.* 2007, 17(11), 3226-3230
[2] WO-A-2006/044290
[3] WO-A-01/071020
[4] H. E. Blackwell et al., *J. Am. Chem. Soc.* 2000, 122, 58-71
[5] S. Chatani et al., *Macromol.* 2014, 47(15), 4894-4900

The invention claimed is:

1. A curable resin, comprising:
   (1) at least one prepolymer resulting from a polymerization of a compound A, wherein compound A comprises at least one aromatic or heteroaromatic cycle, a first group which is a —O—CH$_2$—C≡CH group, and at least one second group which is a —O—CH$_2$—C≡CH or —CH$_2$—CH=CH$_2$ groups, the first and second groups being borne by the aromatic cycle or heteroaromatic cycle; and
   (2) a compound B comprising at least two thiol groups, wherein the resin is cured by reacting the prepolymer with compound B.

2. The curable resin of claim 1, wherein compound A is a product of a propargylation of a compound A', wherein compound A' comprises at least one aromatic or heteroaromatic cycle, a first group which is a hydroxyl or carboxyl group, and at least one second group which is a hydroxyl, carboxyl or —CH$_2$—CH=CH$_2$ group, the first and second groups being borne by the aromatic or heteroaromatic cycle.

3. The curable resin of claim 2, wherein compound A' is an allylated monophenol, a polyphenol, a phenolic acid or a polycarboxylic acid with one or more aromatic or heteroaromatic cycles.

4. The curable resin of claim 2, wherein compound A is derived from a biomass.

5. The curable resin of claim 4, wherein compound A' is chavicol, eugenol, resorcinol, hydroquinone, pyrocathecol, phloroglucinol, pyrogallol, hydroxyquinol, resveratrol, an allylated monophenol dimer, parahydroxybenzoic acid, gallic acid, an isomer of gallic acid, vanillic acid, salicylic acid, 3-hydroxybenzoic acid, 4-hydroxybenzoic acid, protocatechic acid, or an isomer of protocatechic acid.

6. The curable resin of claim 5, wherein compound A' is resorcinol, phloroglucinol, gallic acid, pyrogallol, or a eugenol dimer of formula (I):

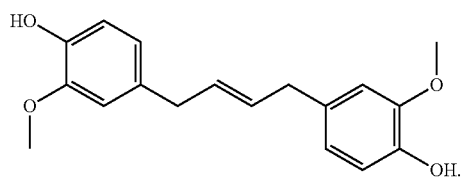

7. The curable resin of claim 1, wherein compound B is derived from a biomass.

8. The curable resin of claim 7, wherein compound B is a product of a thiolation of a compound B', wherein compound B' is obtained from the biomass and comprises at least a first and a second group selected from hydroxyl and carboxyl groups, and wherein the thiolation consists of replacing a hydrogen atom of the first and second groups with a —(CH$_2$)$_3$SH group.

9. The curable resin of claim 8, wherein compound B' is resorcinol, hydroquinone, pyrocathecol, phloroglucinol, pyrogallol, hydroxyquinol, resveratrol, an allylated monophenol dimer, parahydroxybenzoic acid, gallic acid, an isomer of gallic acid, vanillic acid, salicylic acid, 3-hydroxybenzoic acid, 4-hydroxybenzoic acid, protocatechic acid or an isomer of protocatechic acid, a lignin or a tannin.

10. The curable resin of claim 9, wherein compound B' is resorcinol, phloroglucinol, gallic acid, pyrogallol, a lignin, or a eugenol dimer of formula (I):

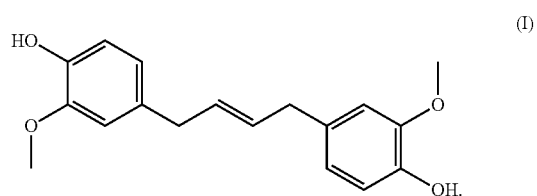 [SMILES: COc1cc(C/C=C/Cc2ccc(O)c(OC)c2)ccc1O]

11. The curable resin of claim 1, wherein compounds A and B are derived from a biomass.

12. The curable resin of claim 11, wherein:
   the prepolymer is a prepolymer of propargylated resorcinol, a prepolymer of propargylated gallic acid, a prepolymer of a propargylated lignin or a prepolymer of a propargylated eugenol dimer, the eugenol dimer being of formula (I):

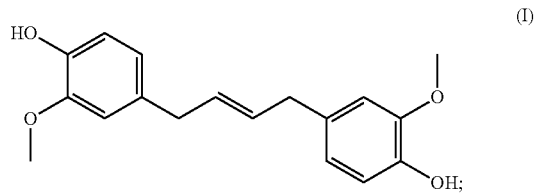 [SMILES: COc1cc(C/C=C/Cc2ccc(O)c(OC)c2)ccc1O]

and
   compound B is a product of a thiolation of a compound B', wherein compound B' comprises at least a first and a second group selected from hydroxyl and carboxyl groups, and is resorcinol, gallic acid, lignin or the eugenol dimer of formula (I), and wherein the thiolation consists of replacing a hydrogen atom of the first and second groups with a —(CH$_2$)$_3$SH group.

13. The curable resin of claim 1, comprising from 80 parts to 95 parts by mass of the prepolymer(s) and 5 parts to 20 parts by mass of compound B.

14. The curable resin of claim 1, further comprising a compound C which is a product of a propargylation of a polyphenol macromolecule derived from a biomass.

15. The curable resin of claim 14, wherein the polyphenol macromolecule is a lignin or a tannin.

16. The curable resin of claim 14 comprising:
   at least one prepolymer which is a prepolymer of propargylated resorcinol, a prepolymer of propargylated gallic acid or a prepolymer of a propargylated eugenol dimer;
   a thiolated resorcinol, a thiolated gallic acid, a thiolated lignin or a thiolated eugenol dimer; and
   a propargylated lignin.

17. The curable resin of claim 14 comprising from 30 parts to 94 parts by mass of the prepolymer(s), from 5 parts to 20 parts by mass of the compound B, and from 1 part to 50 parts by mass of the compound C.

18. A material obtained by curing a curable resin of claim 1.

19. A composite material, comprising a matrix and a reinforcement in the matrix, in which the matrix is obtained by curing a curable resin of claim 1.

20. The composite material of claim 19, wherein the material is an ablative composite material for thermal protection.

21. A curable resin, comprising:
(1) at least one prepolymer resulting from a polymerization of a compound A, wherein compound A comprises at least one aromatic or heteroaromatic cycle, a first group which is a —O—$CH_2$—C≡CH group, and at least one second group which is a —O—$CH_2$—C≡CH or —$CH_2$—CH=$CH_2$ group, the first and second groups being borne by the aromatic cycle or heteroaromatic cycle; and
(2) a compound B comprising at least two thiol groups, wherein compound B is a product of a thiolation of a compound B', wherein compound B' comprises at least a first and a second group selected from hydroxyl and carboxyl groups, and wherein the thiolation consists in replacing a hydrogen atom of the first and second groups with a —$(CH_2)_3$SH group;
wherein the resin is cured by reacting the prepolymer with compound B.

* * * * *

UNITED STATES PATENT AND TRADEMARK OFFICE
CERTIFICATE OF CORRECTION

PATENT NO. : 10,829,581 B2  
APPLICATION NO. : 16/073719  
DATED : November 10, 2020  
INVENTOR(S) : Rivieres et al.

Page 1 of 1

It is certified that error appears in the above-identified patent and that said Letters Patent is hereby corrected as shown below:

Column 19, Claim 1, Line 22:  
"groups, the first and secon"  
Should read:  
--group, the first and second--

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*